US008425769B2

(12) United States Patent
Gift et al.

(10) Patent No.: US 8,425,769 B2
(45) Date of Patent: Apr. 23, 2013

(54) FILTER ARRANGEMENT AND METHODS

(75) Inventors: Gary H. Gift, Richfield, MN (US);
Jeffrey J. Theisen, Burnsville, MN (US)

(73) Assignee: Donaldson Company, Inc.,
Minneapolis, MN (US)

( * ) Notice: Subject to any disclaimer, the term of this patent is extended or adjusted under 35 U.S.C. 154(b) by 582 days.

(21) Appl. No.: 12/522,518

(22) PCT Filed: Jan. 8, 2008

(86) PCT No.: PCT/US2008/050463
§ 371 (c)(1),
(2), (4) Date: Feb. 4, 2010

(87) PCT Pub. No.: WO2008/086328
PCT Pub. Date: Jul. 17, 2008

(65) Prior Publication Data
US 2010/0140155 A1  Jun. 10, 2010

Related U.S. Application Data

(60) Provisional application No. 60/884,093, filed on Jan. 9, 2007.

(51) Int. Cl.
*B01D 27/10* (2006.01)
*B01D 27/14* (2006.01)
(52) U.S. Cl.
USPC ...... 210/130; 210/132; 210/167.05; 210/315; 210/341; 210/342; 210/DIG. 17
(58) Field of Classification Search .............. 210/130, 210/132, 133, 167.05, 256, 315, 341, 342, 210/DIG. 17
See application file for complete search history.

(56) References Cited

U.S. PATENT DOCUMENTS 3,370,708 A 2/1968 Hultgren et al.
3,467,256 A * 9/1969 Humbert, Jr. et al. ........ 210/132
(Continued)

FOREIGN PATENT DOCUMENTS

DE 103 52 703 A1 6/2005
EP 737502 A2 * 10/1996
(Continued)

OTHER PUBLICATIONS

Extended European Search Report mailed Sep. 3, 2012.
International Search Report and Written Opinion for PCT/US2008/050463 mailed May 7, 2008.

*Primary Examiner* — Terry Cecil
(74) *Attorney, Agent, or Firm* — Merchant & Gould P.C.

(57) ABSTRACT

A filter arrangement includes a filter cartridge having a first filter element and a second filter element. The first filter element includes a first tubular section of filter media extending between first and second end caps and defining a first open filter interior. The second filter element includes a second tubular section of filter media operably oriented in the first open filter interior. The second tubular section of filter media extends between third and fourth end caps and defines a second open filter interior. The first end cap defines an inner container and an outer container circumscribing the inner container. The outer container is secured to the first tubular section of filter media. The inner container has an end wall axially spaced from the outer container. The third end cap has a media end secured to the second tubular section of filter media and a tubular wall axially extending from the media end. The tubular wall is circumscribed by the inner container of the first end cap. The filter arrangement further includes a housing for the cartridge, and can be either a spin-on or a bowl-cartridge filter. The filter arrangement is usable in a hydraulic system including a sump; an implement valve; a pump; and a filter head in fluid communication with the sump, implement valve, pump, and filter arrangement.

11 Claims, 28 Drawing Sheets

U.S. PATENT DOCUMENTS

| | | |
|---|---|---|
| 4,126,553 A | 11/1978 | Berg |
| 4,243,397 A * | 1/1981 | Tokar et al. ................. 55/487 |
| 5,520,801 A * | 5/1996 | Gerber et al. ............... 210/130 |
| 3,272,336 A | 9/1996 | Humbert, Jr. |
| 5,888,383 A * | 3/1999 | Cox ............................ 210/130 |
| 6,217,755 B1 | 4/2001 | Stifelman et al. |
| 6,572,667 B1 | 6/2003 | Greif et al. |
| 6,733,666 B1 | 5/2004 | Wilkendorf et al. |
| 7,094,343 B2 | 8/2006 | Moessinger et al. |
| 2006/0112668 A1 | 6/2006 | Gieseke et al. |

FOREIGN PATENT DOCUMENTS

| | | |
|---|---|---|
| GB | 2 295 331 | 5/1996 |
| GB | 2 308 986 | 7/1997 |
| WO | WO 2006/034448 A1 | 3/2006 |
| WO | WO 2007/108917 A1 | 9/2007 |
| WO | WO 2008/030323 A1 | 3/2008 |
| WO | WO 2009/050752 A1 | 4/2009 |

\* cited by examiner

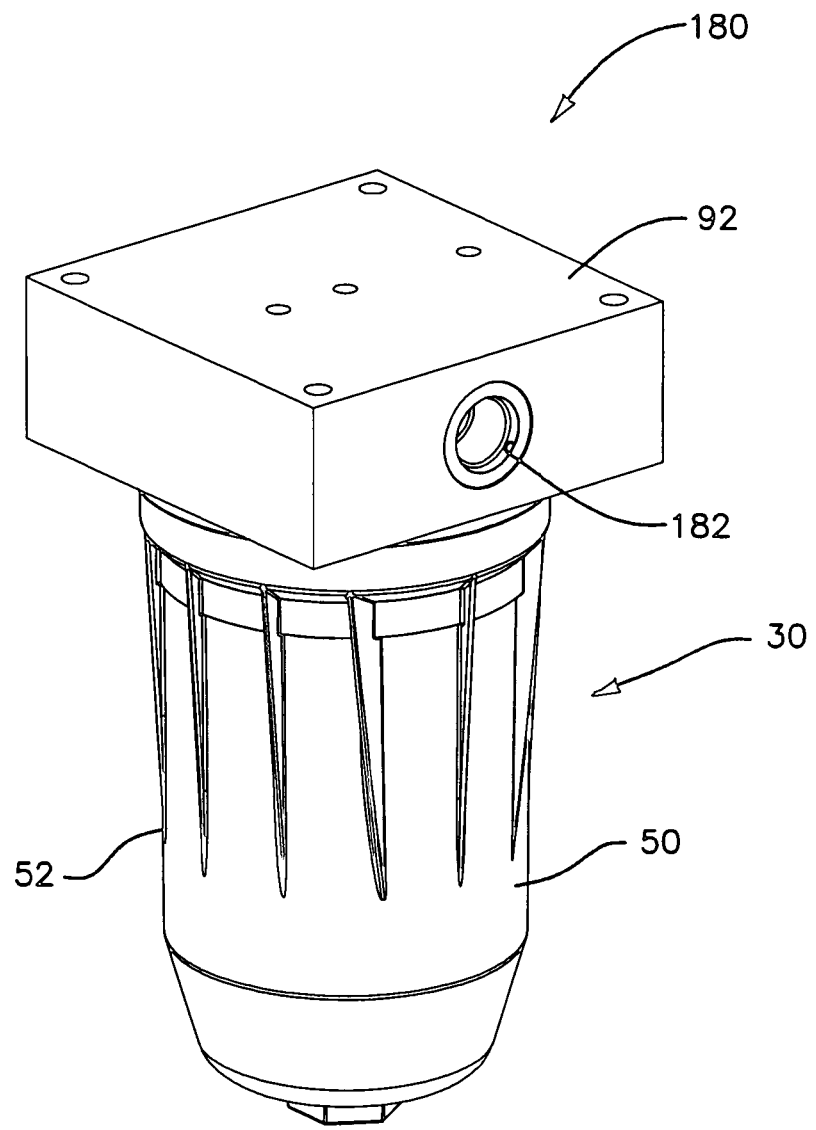

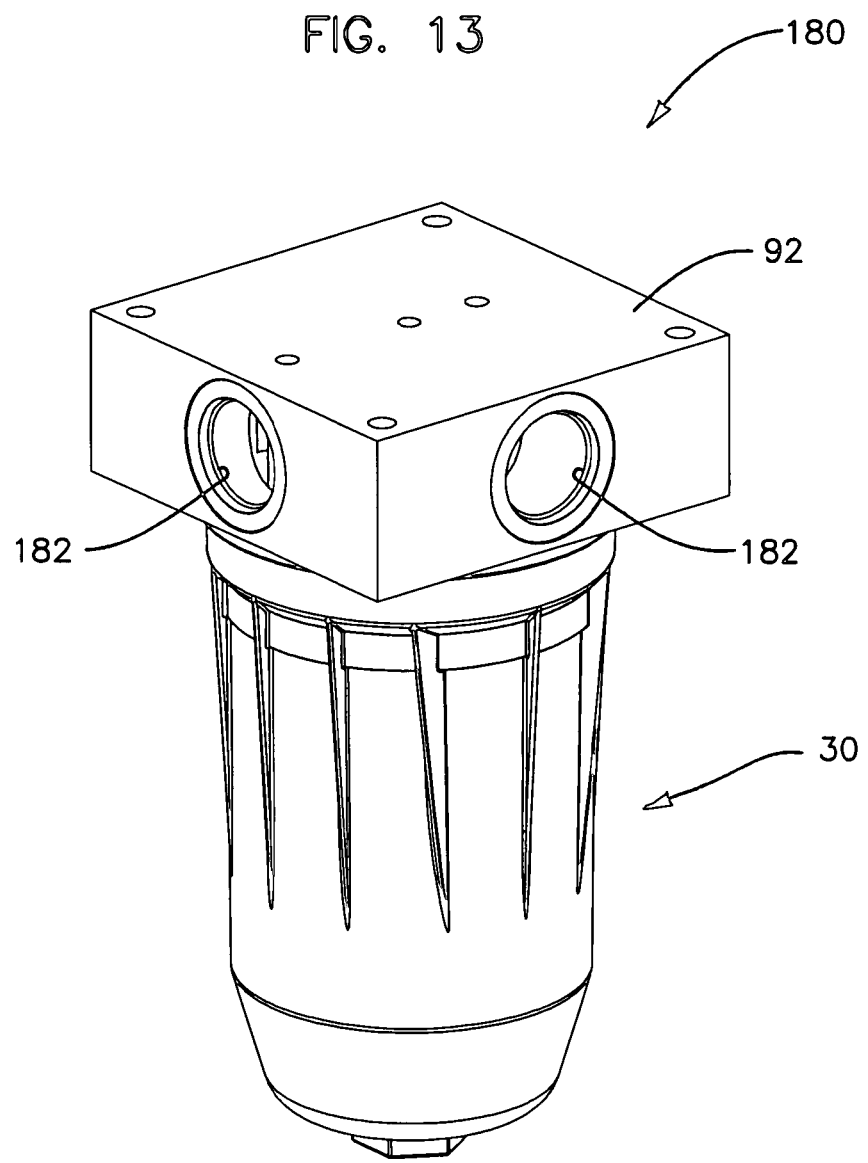

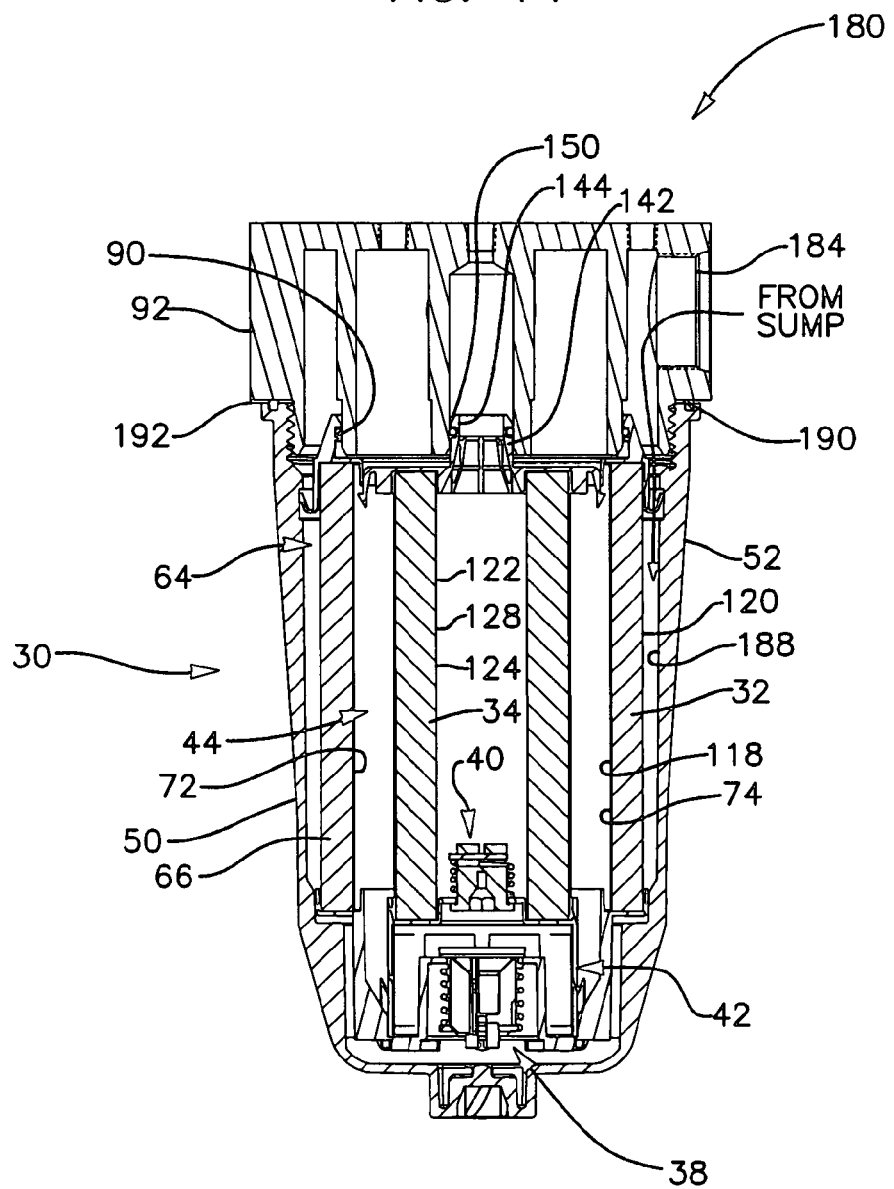

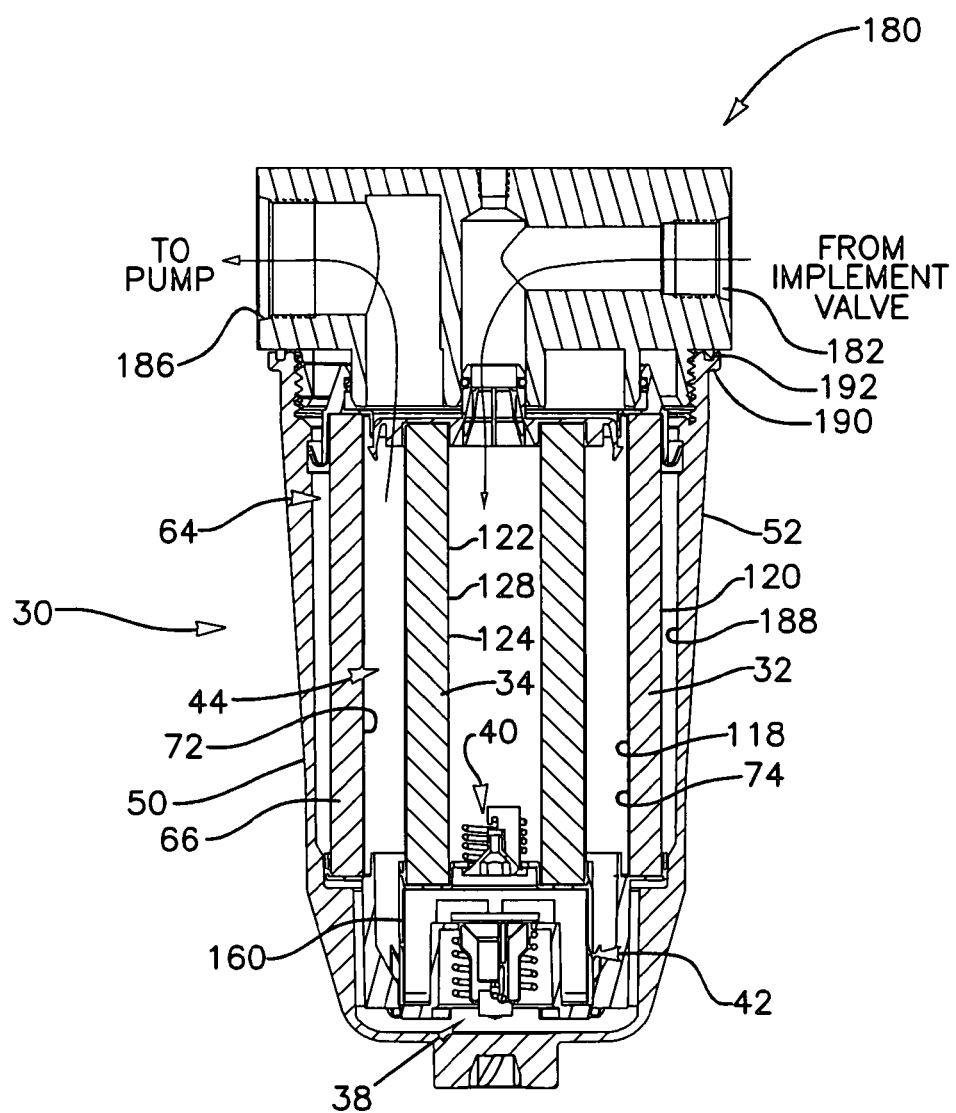

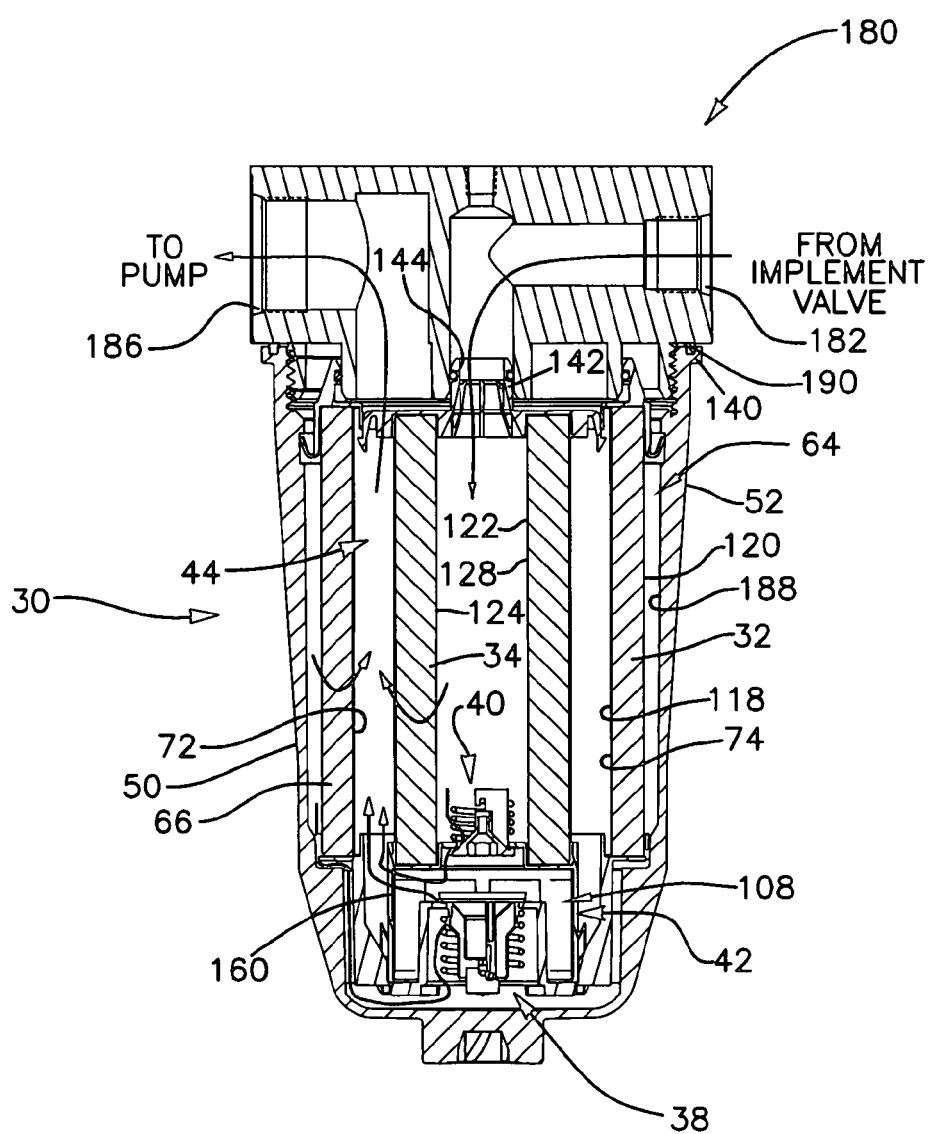

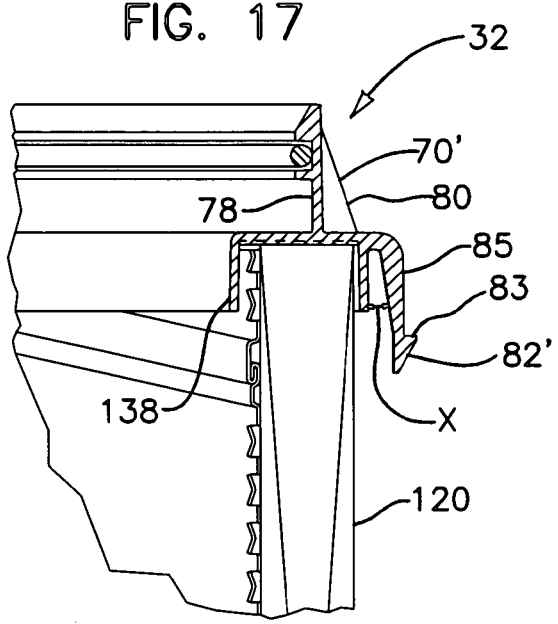
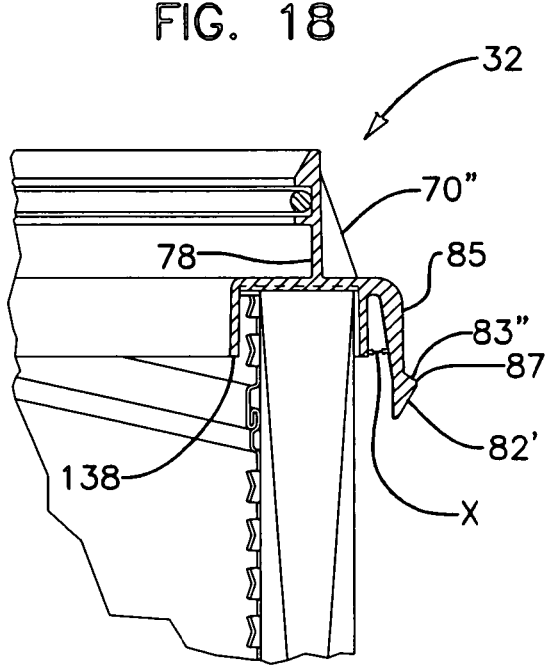

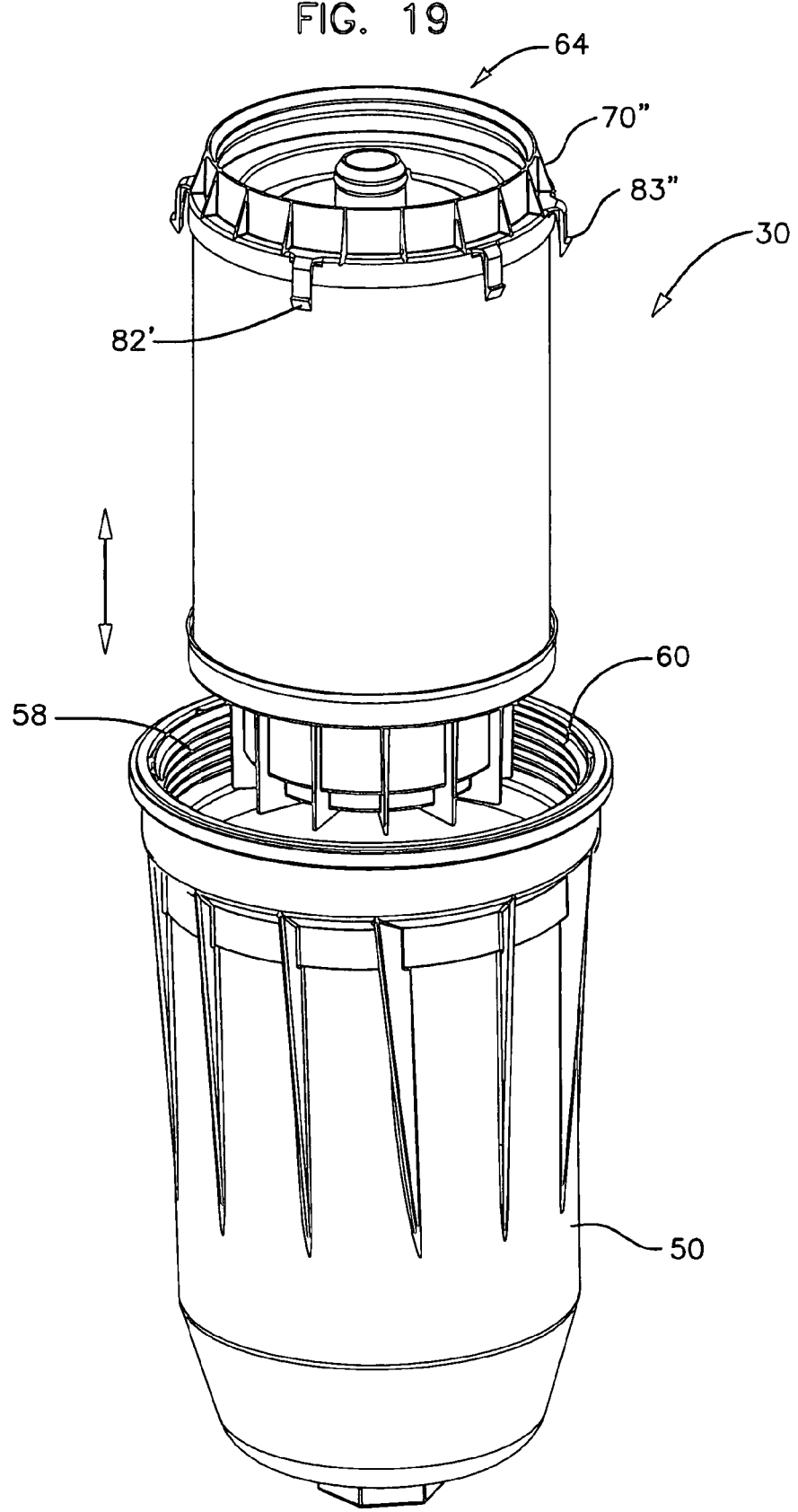

US 8,425,769 B2

FILTER ARRANGEMENT AND METHODS

This application is being filed on Jul. 8, 2009 as a National Stage of PCT International Application No. PCT/US2008/050463, in the name of Donaldson Company, Inc., a U.S. national corporation, applicant for the designation of all countries except the US, and Gary H. Gift and Jeffrey J. Theisen, both citizens of the U.S., applicants for the designation of the US only, and claims priority to U.S. Provisional Application Ser. No. 60/884,093, filed Jan. 9, 2007. These applications are incorporated herein by reference.

TECHNICAL FIELD

This disclosure relates to filter assemblies, filter elements, methods of filtering, and methods of servicing. In example implementations, this disclosure relates to filtering technology useful for purifying hydraulic systems used in, for example, heavy equipment such as tractors.

BACKGROUND

Filter devices are used in many types of applications. In one application, filter devices are used to filter hydraulic fluid, for example, hydraulic oil in hydraulic systems. In many cases, the hydraulic systems must meet high demands to fulfill intended functions while not wearing over the operating times. Over a period of use, the filter devices will become clogged with debris and particulate matter. The filter devices, therefore, must be either cleaned or replaced. In many typical filters, the filters are designed to be removed, disposed of, and replaced with new filters. Improvements in filter devices are continually being sought.

SUMMARY OF THE DISCLOSURE

A filter arrangement includes a filter cartridge having a first filter element and a second filter element. The first filter element includes a first tubular section of filter media extending between first and second end caps and defining a first open filter interior. The second filter element includes a second tubular section of filter media operably-oriented in the first open filter interior. The second tubular section of filter media extends between third and fourth end caps and defines a second open filter interior. The first end cap defines an inner container and an outer container circumscribing the inner container. The outer container is secured to the first tubular section of filter media. The inner container has an end wall axially spaced from the outer container. The third end cap has a media end secured to the second tubular section of filter media and a tubular wall axially extending from the media end. The tubular wall is circumscribed by the inner container of the first end cap.

In preferred embodiments, the filter arrangement further includes a housing having a surrounding wall defining an interior volume. The housing includes connection structure to permit selective attachment to a filter head. The filter cartridge is operably oriented within the interior volume of the housing. In one embodiment, the filter cartridge is removable and replaceable within the housing, to be a bowl-cartridge filter. In another embodiment, the filter cartridge is permanently secured within the housing, to be a spin-on filter.

In another aspect, a hydraulic system is provided. The hydraulic system includes a sump; an implement valve; a pump; a filter head in fluid communication with the sump, implement valve, and pump; and a filter arrangement operably and removably secured to the filter head. The filter head includes a sump inlet arrangement downstream of the sump, an implement valve inlet arrangement downstream of the implement valve, and a pump outlet arrangement upstream of the pump. The filter arrangement includes a filter housing having an interior volume and a filter cartridge operably oriented in the interior volume. The filter cartridge can be the type as characterized above. The sump inlet arrangement is upstream of and in fluid communication with an upstream side of the first filter element. The upstream side of the first filter element is an outer side of the first tubular section of filter media. The implement valve inlet arrangement is upstream of and in fluid communication with the upstream side of the second filter element. The pump outlet arrangement is downstream of and in fluid communication with the downstream side of the first filter element and a downstream side of the second filter element. The downstream side of the second filter element is an outer side of the second tubular section of filter media.

In another aspect, a method of servicing a filter arrangement includes removing a filter housing from a filter head. The filter housing contains a filter cartridge; and providing a new, replacement filter cartridge. The new, replacement filter cartridge includes a first filter element and a second filter element. The first filter element and the second filter element can be the type as characterized above.

BRIEF DESCRIPTION OF THE DRAWINGS

FIG. 12 is a perspective view of the filter assembly of FIGS. 3 and 4 connected to a filter head;

FIG. 13 is another perspective view of the filter arrangement depicted in FIG. 12.

FIGS. 14-16 are cross-sectional views of the filter arrangement of FIGS. 12 and 13 and depicting various fluid flow paths through the filter arrangement;

FIG. 17 is an enlarged, fractional, cross-sectional view of the first filter element of FIGS. 5 and 6, but depicting a modification to the second end cap;

FIG. 18 is a cross-sectional view of the first filter element identical to FIG. 17, but showing another modification to the second end cap to depict the filter assembly as a bowl-cartridge assembly;

FIG. 19 is a perspective view of an embodiment of a bowl-cartridge filter assembly and depicting the filter arrangement being removable from the housing or bowl;

DETAILED DESCRIPTION

A. FIGS. 1-19

Figure 1:
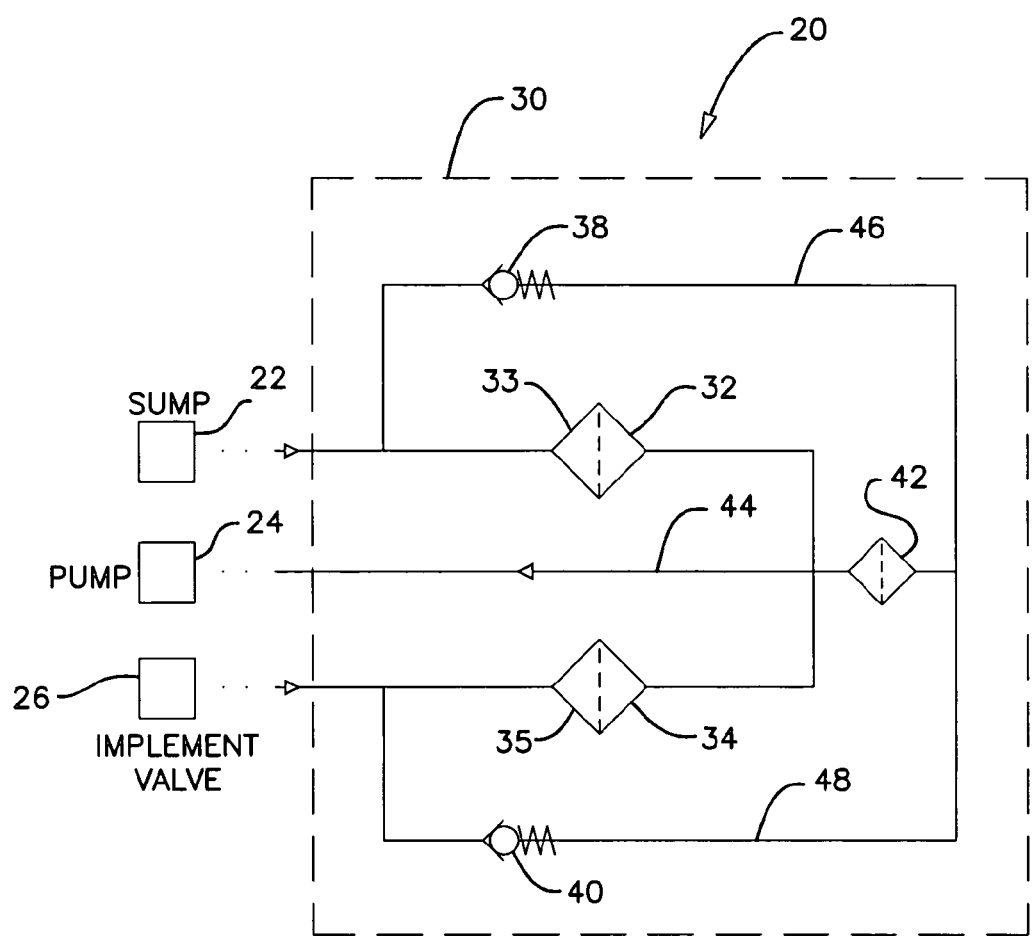
FIG. 1 is a schematic hydraulic circuit constructed to principles of this disclosure.

In FIG. 1, a schematic of a hydraulic system is shown generally at 20. The hydraulic system 20 includes a sump 22, a pump 24, and an implement valve 26. In fluid communication with the sump 22, pump 24, and implement valve 26 is a filter arrangement 30. The filter arrangement 30 includes a first filter element 32 and a second filter element 34. In the hydraulic system 20, the first filter element 32 functions as a suction filter 33, while the second filter element 34 functions as a return filter 35. In this embodiment, the first filter element 32 has an outer bypass valve arrangement 38, while the second filter element 34 has an inner bypass valve arrangement 40. There is a strainer 42 in fluid communication with the flow paths opened by the first bypass valve arrangement 38 and second bypass valve arrangement 40.

In operation, hydraulic fluid is drawn through the suction filter 33 from the sump 22. Between the sump 22 and the filter 33, the fluid flows at a very low (if any) operating pressure, such as about 0 psi. It then flows to an outflow path 44 to the pump 24. Between the pump 24 and the downstream side of the filter 33, the fluid is flowing at an operating pressure of about −1 psi. The pump 24 pumps the hydraulic fluid to be used by downstream hydraulics. After the fluid has been used by the downstream hydraulics, it flows back through the implement valve 26. In typical systems, the fluid from the implement valve 26 flows at an operating pressure of about 5 psi, through the return filter 35, and then into the outflow path 44. At the outflow path 44, it joins fluid that has flown through the suction filter 33. If the suction filter 33 becomes occluded or in the case of a cold-start, the bypass valve arrangement 38 opens and allows hydraulic fluid to flow around or bypass the suction filter 33. The cracking pressure of the bypass valve arrangement 38 will be selected based on the system, and can be about 0.5 bar (7.5 psi). The fluid then flows through fluid bypass path 46. From there, it flows through strainer 42 and into the outflow path 44. Similarly, if the return filter 35 becomes occluded, the bypass valve arrangement 40 opens and allows the fluid to flow around or bypass the return filter and flow into bypass path 48. The cracking pressure of the bypass valve arrangement 40 will be selected based on the system, and can be about 2 bar (29 psi). From there, the fluid flows through strainer 42 and into the outflow path 44.

Figure 2:
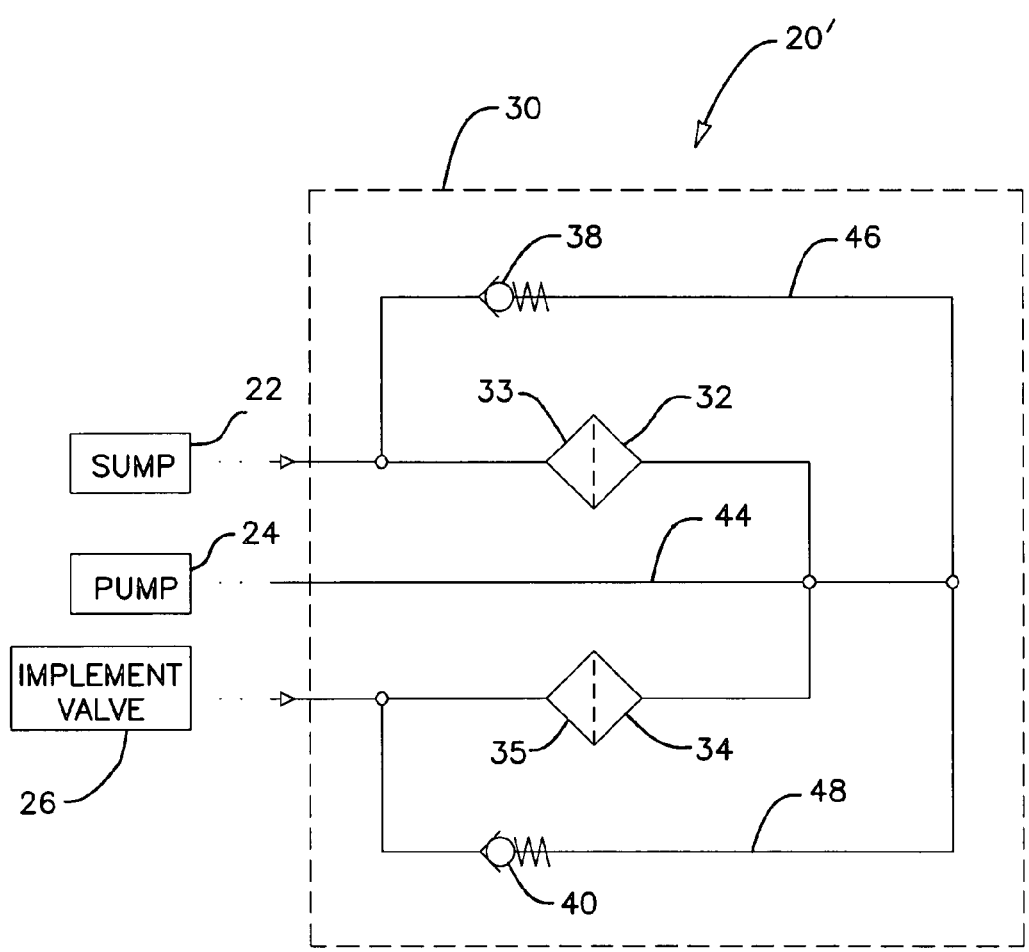
FIG. 2 is a schematic of a second embodiment of a hydraulic circuit constructed according to principles of this disclosure.

FIG. 2 depicts an alternate embodiment of the hydraulic system 20, depicted at 20'. The hydraulic system 20' depicted in FIG. 2 is the same as system 20 of FIG. 1, except that the strainer 42 has been omitted. In some applications, the strainer 42 is not necessary. The strainer 42 will typically comprise a wide mesh and will collect only large particles. The bypass valves 38, 40 will open during a cold-start condition when the oil has a high viscosity; however, there could be a significant pressure drop across the strainer 42 at these cold temperatures. This high pressure drop could cause cavitation of the pump 24 and poor hydraulic performance. Therefore, the added cost of the strainer 42 and potential limitations during a cold start-up may provide reasons to not use the strainer 42. It should be understood that the filter arrangement 30 described herein can alternatively include or not include the strainer 42.

Figure 3:
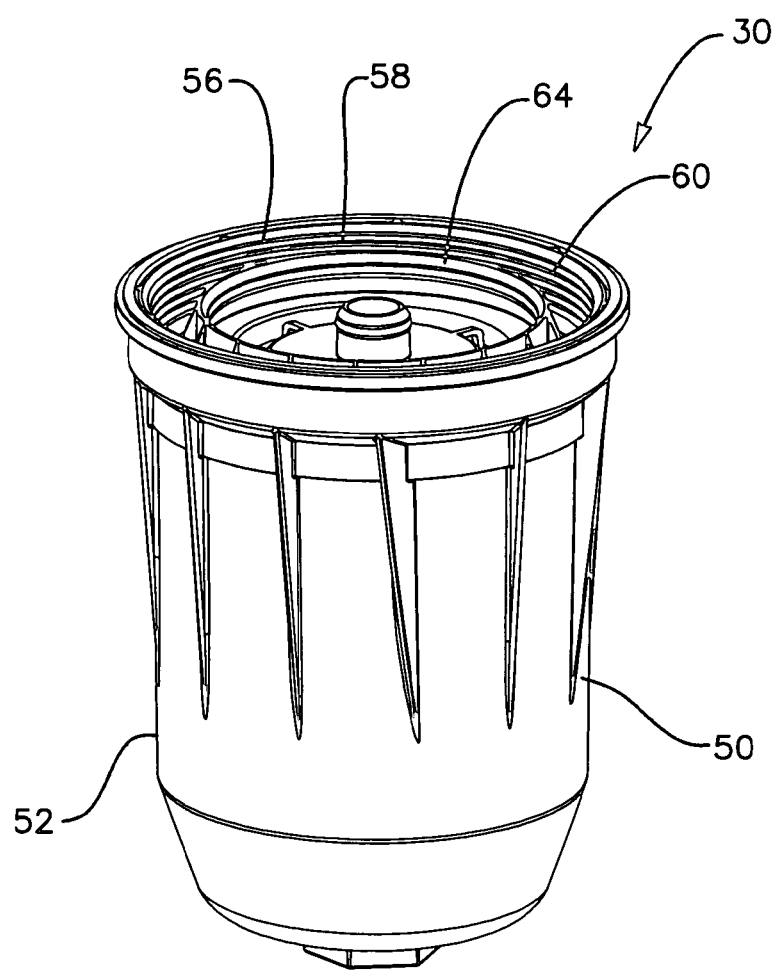
FIG. 3 is a perspective view of an embodiment of a filter assembly usable in the hydraulic circuits of FIGS. 1 and 2, constructed according to principles of this disclosure.
Figure 4:
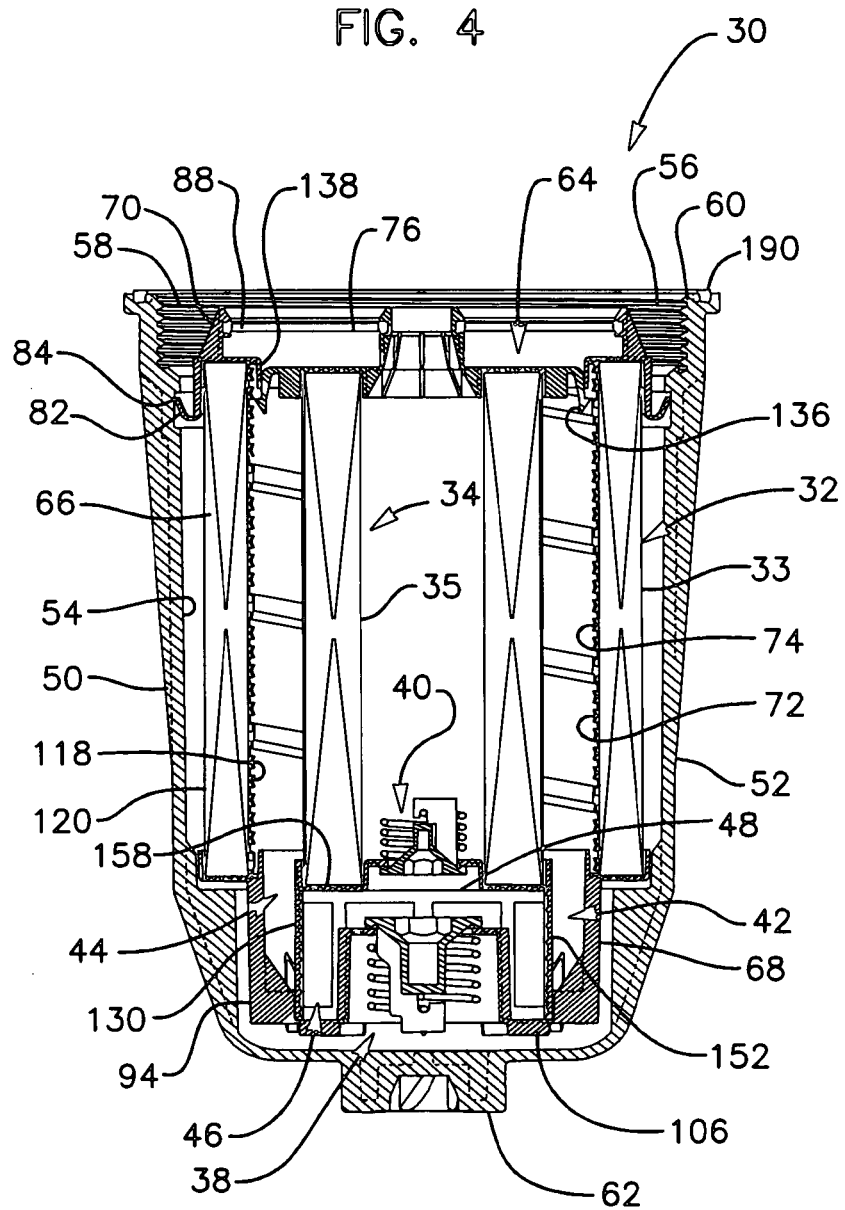
FIG. 4 is a cross-sectional view of the filter assembly of FIG. 3.

Attention is directed to FIGS. 3 and 4. The filter arrangement 30 shown in the hydraulic system 20, 20' is depicted. In FIG. 3, the filter arrangement 30 includes a housing 50 including a surrounding wall 52 defining an interior volume 54. The housing 50 includes connection structure 56, depicted as threads 58 along the inner surface of the wall 52 at an open mouth 60. Opposite to the open mouth 60 is a closed end 62. While the housing 50 can be made from a variety of materials, in one embodiment, the housing 50 is made from non-metal, such as plastic.

Operably oriented within the housing 50 is a filter cartridge 64. In one embodiment, the filter cartridge 64 is removable and replaceable from the housing 50, such that the filter arrangement 30 is a bowl-cartridge filter. In the embodiment depicted in FIG. 4, the filter cartridge 64 is permanently mounted within the housing 50, such that the filter arrangement 30 is a spin-on filter. A spin-on filter is one in which, when the filter arrangement 30 is serviced, the entire housing 50 and filter cartridge 64 are replaced with a new housing 50 containing filter cartridge 64. In a bowl-cartridge filter, the filter cartridge 64 is removed from the housing 50 and replaced with a new filter cartridge 64, and the housing 50 is not replaced.

Figure 5:
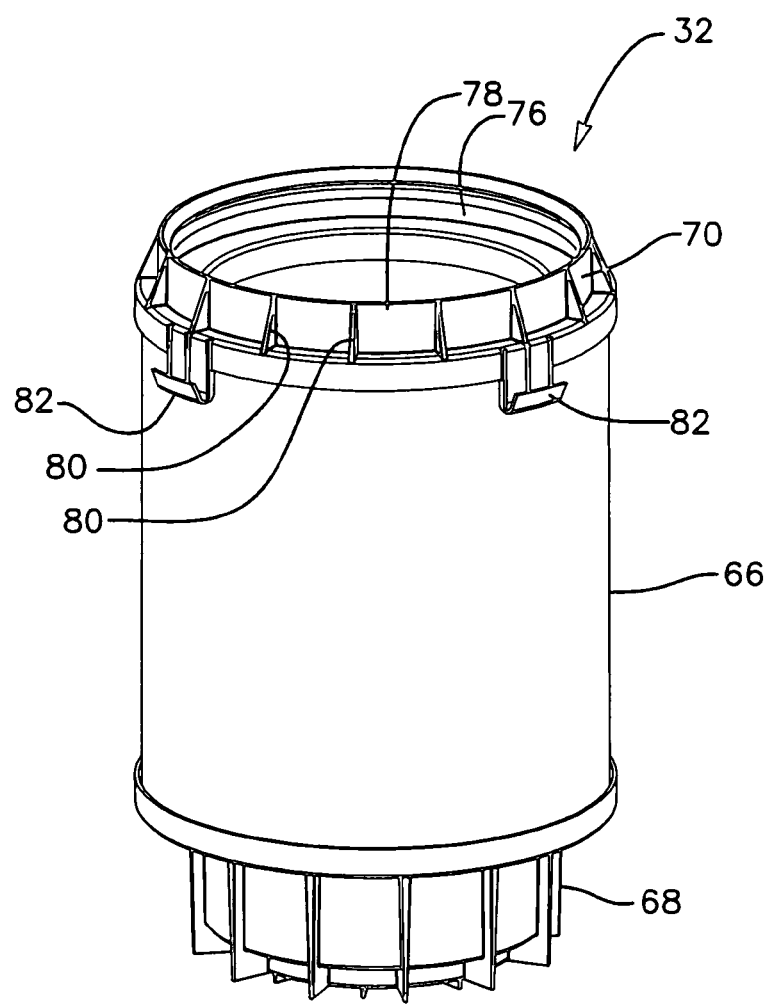
FIG. 5 is a perspective view of a first filter element usable in the filter assembly of FIGS. 3 and 4.
Figure 6:
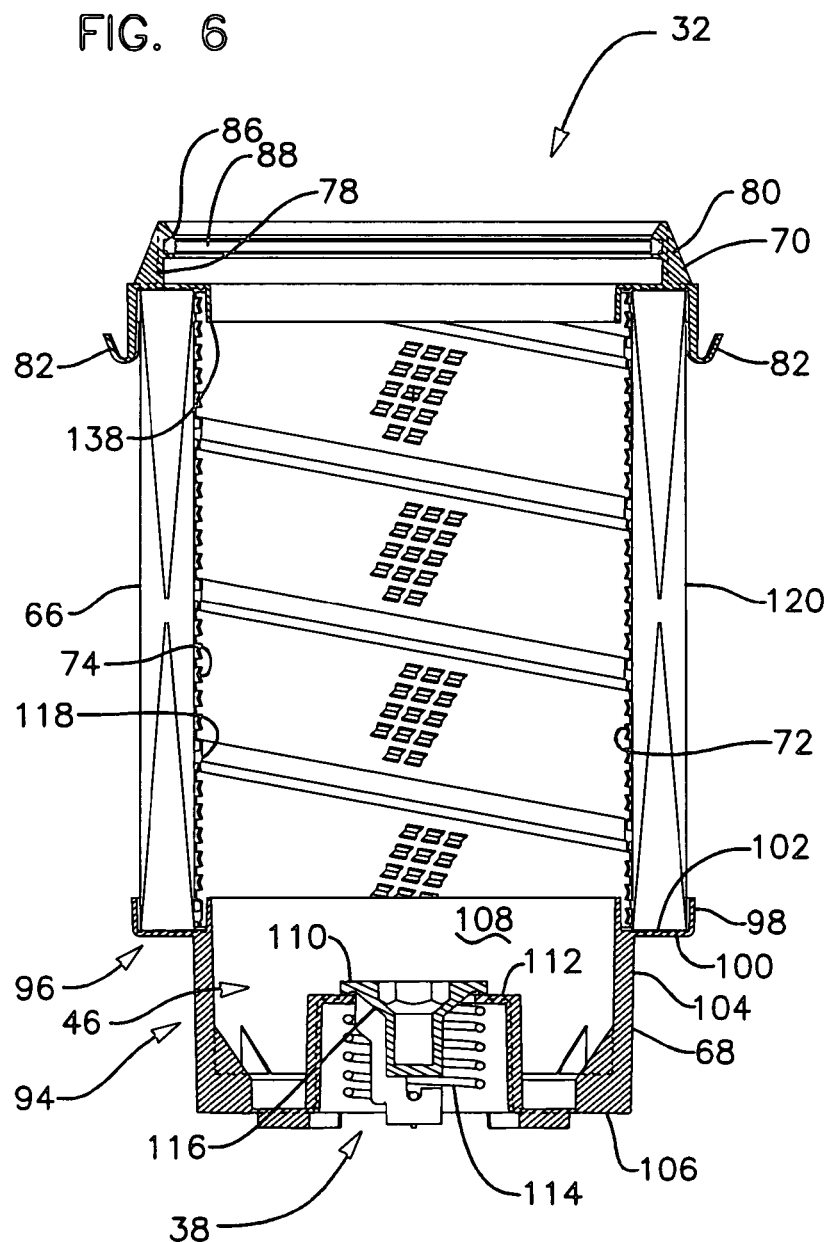
FIG. 6 is a cross-sectional view of the first filter element of FIG. 5.
Figure 7:
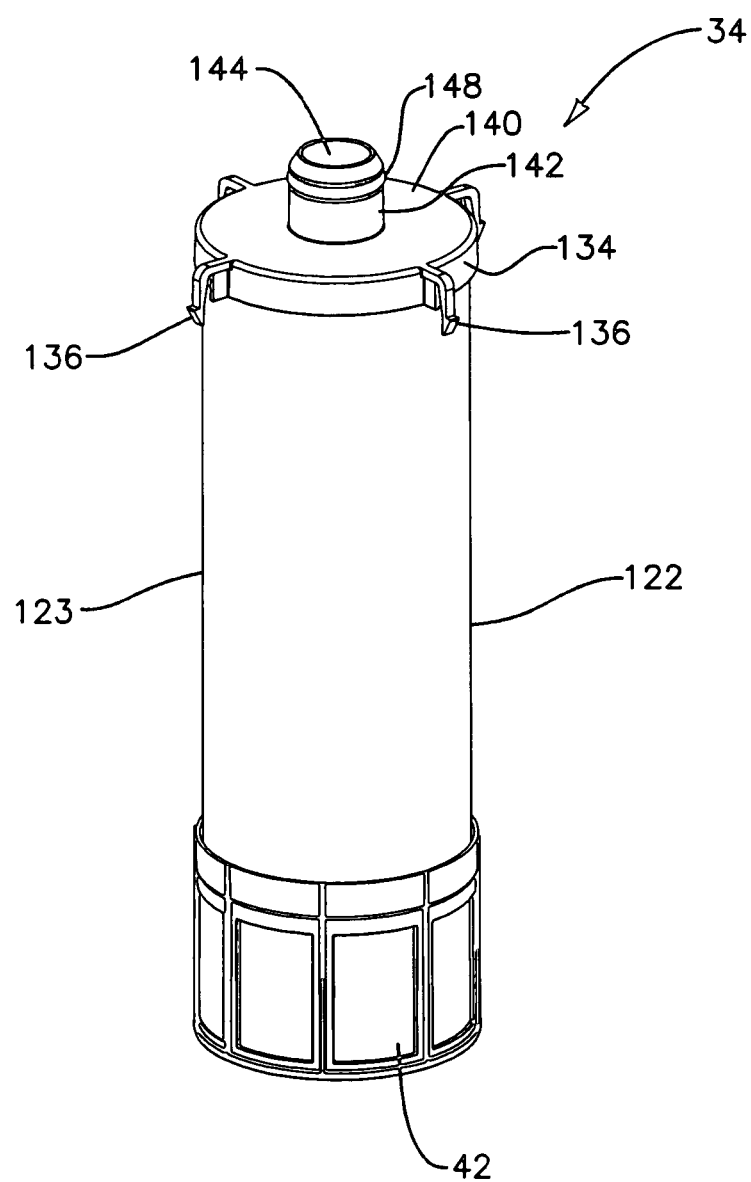
FIG. 7 is a perspective view of a second filter element usable in the filter assembly of FIGS. 3 and 4.
Figure 8:
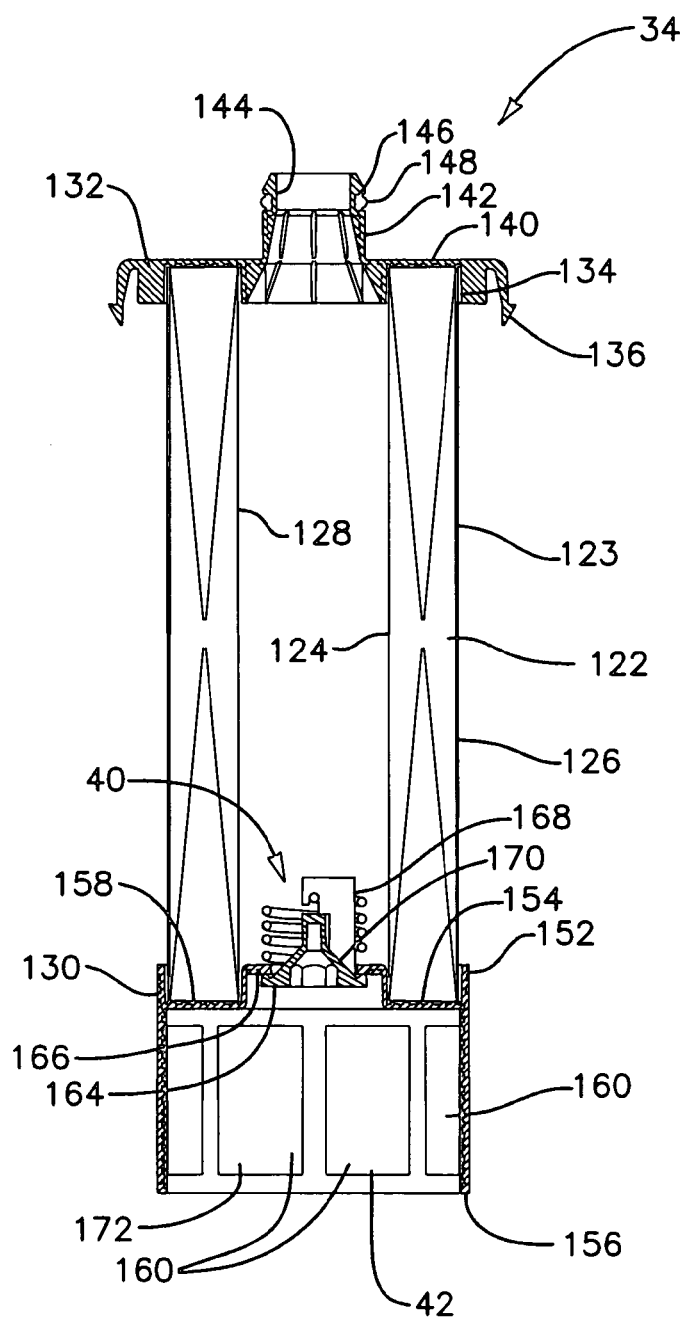
FIG. 8 is a cross-sectional view of the second filter element depicted in FIG. 7.
Figure 9:
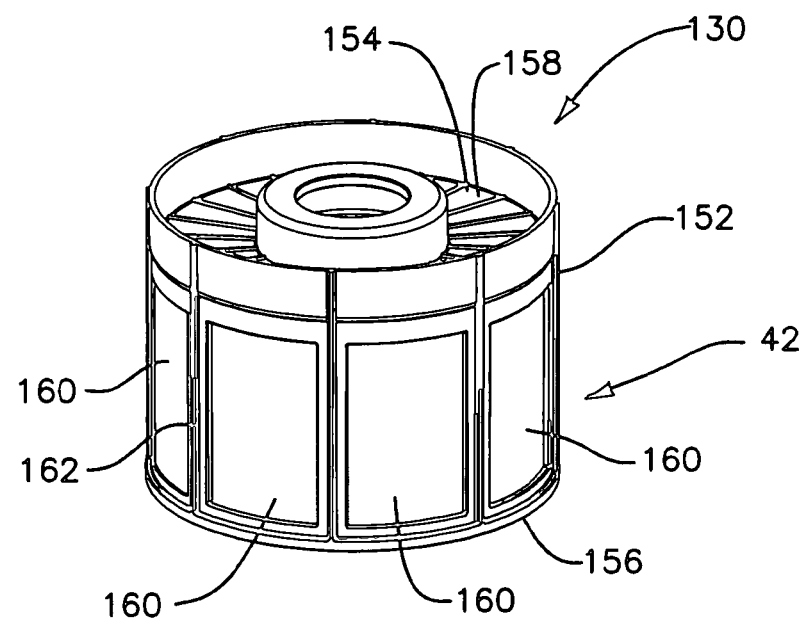
FIG. 9 is a perspective view of one of the end caps used in the second filter element of FIGS. 7 and 8.
Figure 10:
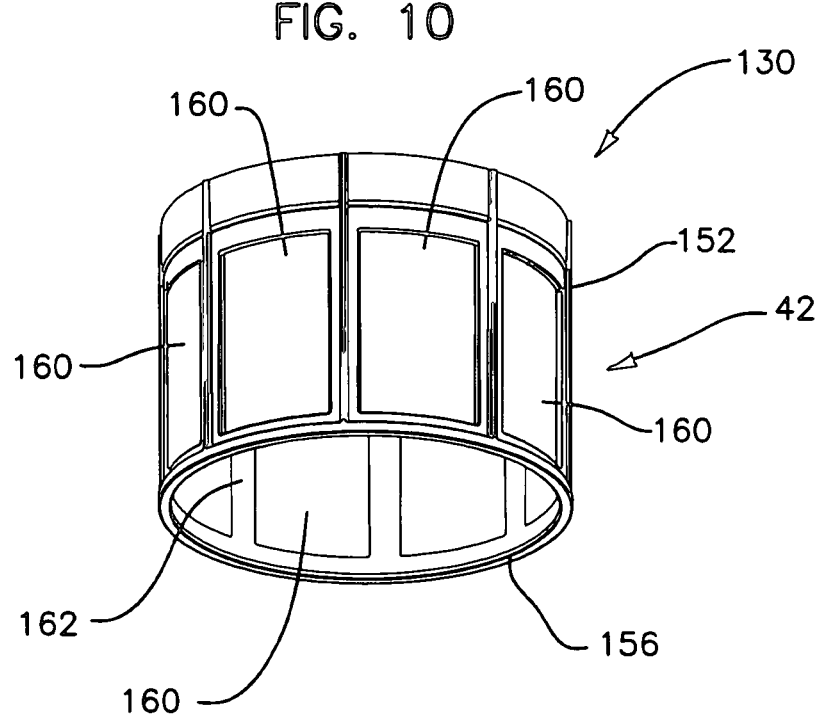
FIG. 10 is another perspective view of the end cap of FIG. 9.
Figure 11:
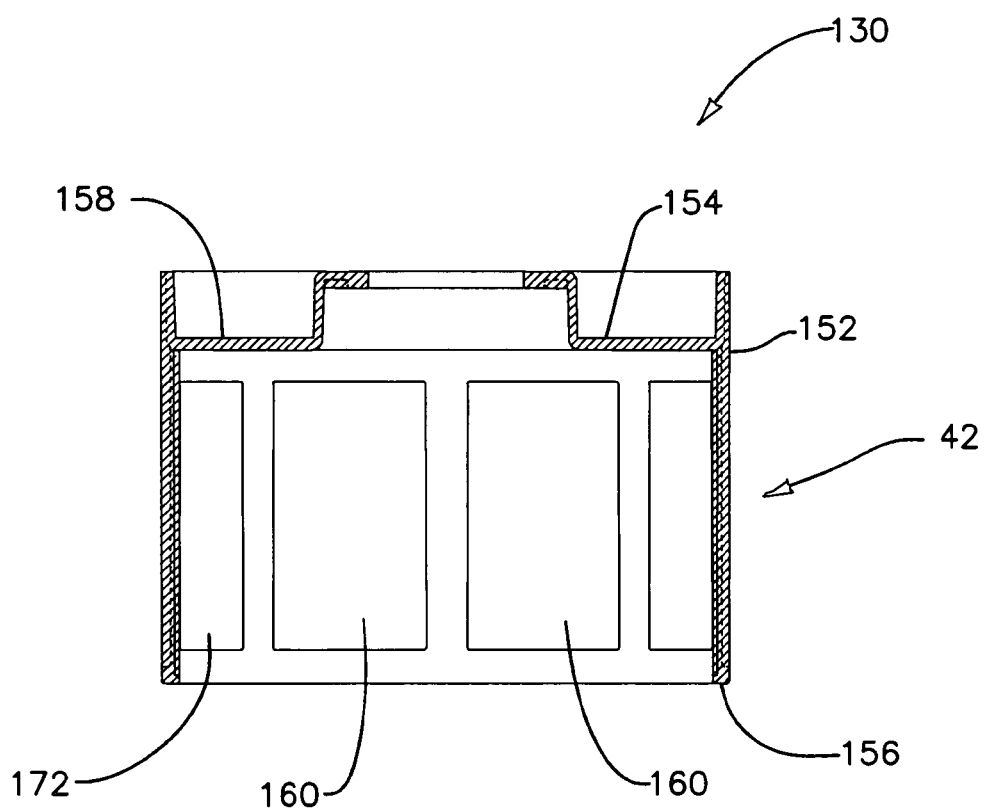
FIG. 11 is a cross-sectional view of the end cap of FIGS. 9 and 10.

The filter cartridge 64 includes the first filter element 32, functioning as suction filter 33 and second filter element 34, functioning as return filter 35. FIGS. 5 and 6 depict the first filter element 32, while FIGS. 7 and 8 depict the second filter element 34.

The first filter element 32 includes a first tubular section of filter media 66. The media 66 can be a variety of types of media, and typically will be pleated media made from synthetic material. The media 66 may also be cellulose, for example. The first tubular section of filter media 66 extends between a first end cap 68 and a second end cap 70. As can be seen in FIG. 6, the first tubular section of filter media 66 defines a first open filter interior 72. Lining the filter media 66 and extending between the first end cap 68 and second end cap 70 and defining the first open filter interior 72 is an inner liner 74.

The second end cap 70 defines an opening 76, and as such, is an open end cap. The opening 76 allows fluid access to the first open filter interior 72. The second end cap 70 includes an upstanding ring 78 and is supported by a series of spaced vanes 80. The second end cap 70 also includes a plurality of hooked flanges 82 extending radially outwardly therefrom and in a direction opposite of the upstanding ring 78. In the spin-on embodiment, the flanges 82 catch a protrusion 84 (see FIG. 4) extending from an interior surface of the housing surrounding wall 52.

FIG. 17 illustrates a cross-sectional view of a portion of the first filter element 32, but depicts an alternative arrangement of the second end cap, shown at 70'. The second end cap 70' includes upstanding ring 78 supported by spaced vanes 80. The second end cap 70' also includes hooked flanges 82'. While in the embodiment of FIG. 6, the flanges 82 are J-shaped, in the embodiment of FIG. 17, the flanges 82' each defines a catch 83 and defines an open volume x between a stem 85 of the flange 82' and a remaining portion of the second end cap 70'. The volume x allows for space so that the stem 85 can deflect radially inwardly while the filter cartridge 64 is being installed in the housing 50. The catch 83 will engage or catch protrusion 84 (FIG. 4) extending from an interior surface of the housing surrounding wall 52.

FIG. 18 shows another embodiment of the second end cap 70". The embodiment of the second end cap 70" is the same as the embodiment of 70' of FIG. 17, except that the catch 83" defines a sloped surface 87. The sloped surface 87 is an angled surface that angles in a direction from a remaining portion of the first filter element 32 downwardly. This feature allows the filter cartridge 64 to be selectively removable and replaceable from the filter housing 50. Thus, FIG. 18 illustrates an embodiment of filter cartridge 64 that would operate as a bowl-cartridge filter assembly. The sloping surface 87 allows the filter element 32 to be installed within the housing 50, such that the catch 83" engages protrusion 84 of FIG. 4. The slope 87 along with the gap or space x allows the stem 85 to deflect inwardly and the catch 83" to disengage from the protrusion 84, which allows the filter arrangement 30 to be removed from the housing 50. By comparing FIG. 17 and FIG. 18, it should be appreciated that FIG. 17 would generally be a spin-on embodiment, while FIG. 18 would be a bowl-cartridge filter embodiment. FIG. 19 illustrates the filter arrangement 30, including the first filter element 32 of the embodiment of FIG. 18, with the second end cap 70". In FIG. 19, the filter cartridge 64 is shown how it can be selectively inserted and removed from the housing 50 through the open mouth 60.

Returning again to FIG. 6, the second end cap 70 further includes a groove 86 along an interior portion of the upstanding ring 78. The groove 86 is a seat for a seal member 88. The seal member 88 forms a releasable seal 90 (see FIG. 14) with a filter head 92.

In reference now to FIG. 6, the first end cap 68 defines an inner container 94 and an outer container 96. The outer container 96 circumscribes or surrounds the inner container 94. The outer container 96 includes an outer rim 98, and perpendicular to the outer rim 98, a base 100. The base 100 is secured to the first tubular section of filter media 66 at an end 102. The base 100 extends between the outer rim 98 and wall 104 of the inner container 94. Perpendicular to the wall 104 and generally parallel to the base 100 is an end wall 106. Together, the end wall 106 and wall 104 define an inner container volume 108. The inner container volume 108 also defines the bypass flow path 46. As can be seen in FIG. 6, the end wall 106 is axially spaced from base 100 and outer container 94.

The inner container 94 operably holds the outer bypass valve arrangement 38 therein. In FIG. 6, it can be seen how the outer bypass valve arrangement 38 includes a valve head 110 mounted on a valve seat 112. The valve seat 112 extends perpendicularly from the end wall 106 into the inner container volume 108. A spring member 114 functions to bias the valve head 114 in a closed position against the valve seat 112. In a cold-start condition or when the filter media 66 is occluded, fluid pressure will build against an upstream side 116 of the valve head 110, and the force will be greater than the force exerted by the spring member 114. Eventually, the force against the upstream side 116 of the valve head 110 will be greater than the spring member 114 and cause the valve head 110 to move away from the valve seat 112. This will open a gap between the valve seat 112 and the valve head 110, permitting fluid to flow into the inner container volume 108, which is also the bypass flow path 46. This is also in fluid communication with the first open filter interior 72 (which, in the embodiment depicted, is a downstream side 118 of the filter media 66—the upstream side 120 of the media 66 is the outer, exterior portion of the filter media 66.)

Attention is next directed to FIGS. 7 and 8. The second filter element 34 is depicted. The second filter element 34 includes a second tubular section of filter media 122 having an upstream side 124 and a downstream side 126. The second tubular section of filter media 122 defines a second open filter interior 128 which is adjacent and next to the upstream side 124. The filter media 122 can be various types of media, and in the embodiment shown, is pleated media. The media 122 can be made from various materials including synthetic or cellulose media. The second tubular section of filter media 122 extends between a third end cap 130 and a fourth end cap 132. In the embodiment illustrated, the second filter element 34 further includes an outer liner 123 extending between the third end cap 130 and the fourth end cap 132. The outer liner 123 can be made from perforated metal.

The fourth end cap 132 includes an outer rim 134. Projecting from the outer rim 134 are a plurality of hooked flanges 136. In the embodiment shown, there are four, evenly spaced, hooked flanges 136. As can be seen in the embodiment of FIG. 4, the hooked flanges 136 engage by hooking onto an interior rim 138 of the second end cap 70 of the first filter element 32.

The fourth end cap 132 further includes an end wall 140 generally perpendicular to the outer rim 134. The end wall 140 and outer rim 134 together define a holding tray for securing an end of the media 122.

The fourth end cap 132 further includes a centrally extending tubular wall 142. The tubular wall 142 defines an opening 144, which is in open, fluid communication with the second open filter interior 128. The tubular wall 142 defines a groove 146 along the outer radial surface for holding a seal member 148. The seal member 148 forms a seal 150 (see FIG. 14) with the filter head 92, when the filter arrangement 30 is operably connected to the filter head 92.

The third end cap 130 has an outer wall 152 and first and second opposite ends 154, 156. The first end 154 also corresponds to a media end 158 and is secured to the second tubular section of media 122. The outer wall 152 is a tubular wall and extends from the media end 154 terminating at the second end 156. The end 156 is remote from the filter media 122. When the second filter element 34 is operably part of the filter assembly 30, the tubular wall 152 of the third end cap 130 is oriented within the volume 108 of the inner container 94 and is circumscribed by the inner container 94.

In the hydraulic system of FIG. 1 which uses strainer 42, the strainer 42 is part of the third end cap 130. Attention is directed to FIGS. 8-11, which shows the third end cap 130. The third end cap 130 includes strainer 42 depicted, in this embodiment, as a plurality of mesh screens 160 supported and held by a frame 162. The frame 162 is depicted as a plurality of spaced support members extending longitudinally along the end cap 130. In typical embodiments, the end cap 130 including the frame 162 will be made from a non-metal material, such as plastic. The screens 160 will be an open mesh that prevents large debris from passing into the outflow channel 44 and otherwise does not impede flow. The mesh size for the screens can vary, based on the system, and in typical systems can be about 250 micron or 50 mesh (50 wires/inch).

As can be seen in FIG. 4, when the second filter element 34 and the first filter element 32 are operably assembled together, the tubular wall 152 of the third end cap 130 is oriented against the end wall 106 of the inner container 94. As can be seen, the tubular wall 152 includes the strainer 42 extending between the media end 158 of the third end cap 130 and the end wall 106 of the inner container 94.

Attention is again directed to FIG. 8. The inner bypass valve arrangement 40 is secured to the third end cap 130 and is within the open filter interior 128 of the second tubular section of media 122. The inner bypass valve arrangement 40 is constructed similarly to the outer bypass valve arrangement 38. The inner bypass valve arrangement 40 includes a valve head 164 biased against a valve seat 166 by a spring member 168. The valve seat 166 is defined by the third end cap 130. An upstream side of the valve head is shown at 170 and is in fluid communication with the upstream side 124 of the second tubular section of media 122. In the case of a cold-start or when the filter media 122 is occluded, the pressure on the upstream side 170 of the valve head 164 will overcome the pressure caused by the force of the spring 168. This will open a gap between the valve head 164 and valve seat 166, which will permit fluid to flow into volume 172. Volume 172 is the inner volume defined by the tubular wall 152 of the third end cap 130. From there, the fluid flows through the screen 160 of the strainer 42 and then to the outflow path 44.

FIGS. 12-16 depict the overall filter assembly 180, which includes filter head 92 operably connected to the filter arrangement 30. The filter head 92 is in fluid communication with the hydraulic system 20. In FIG. 12, an implement valve inlet port 182 is viewable. The implement valve inlet port 182 is in fluid communication with the implement valve 26.

FIG. 13 is also a perspective view of a filter assembly 180. In the view in FIG. 13, the sump inlet port 184 can be seen, as well as the pump outlet port 186. The sump inlet port 184 is downstream of and in fluid communication with the sump 22. The pump outlet port 186 is upstream of and in fluid communication with the pump 24.

FIGS. 14-16 depict cross-sectional views of the filter assembly 180 and show operative flow paths through the assembly 180. FIG. 14 shows fluid flowing from the sump 22 (FIGS. 1 and 2) through the sump inlet port 184, into the volume 188 defined between the upstream side 120 of the first filter element 32 and an inner section of the housing wall 52. From there, in normal conditions, the fluid will flow through the first tubular section of filter media 66, into the first open filter interior 72, into the outflow path 44, and back into the filter head 92 in a space between the first filter element 32 and second filter element 34.

Also viewable in FIGS. 14-16 is a seal 192 between the filter head 92 and the housing 50. The seal 192 is created by seal member 190 circumscribing the open mouth 60 of the housing 50.

FIG. 15 shows the outflow path 44 and the filtered fluid flowing back into the filter head 92 and through the pump outlet port 186. The filtered fluid then travels to the pump 24. In FIG. 15, the fluid is also shown entering the filter head 92 from the implement valve 26 (FIGS. 1 and 2) through the implement valve inlet port 182. From there, the fluid flows through the opening 144 in the tubular wall 142 of the second filter element 34. From there, it enters into the second open filter interior 128. During normal conditions, the fluid then flows through the second tubular section of filter media 122 and to the outflow path 44, where it meets up with fluid that has flown through the first tubular section of filter media 66, in which it then flows into the filter head 92 and out through the pump outlet port 186.

FIG. 16 illustrates flow paths during conditions that open the outer bypass valve arrangement 38 and inner bypass valve arrangement 40. While FIG. 16 illustrates both bypass valve arrangements 38 and 40 in an open condition, it should be understood that during some situations, only one or the other of the bypass valve arrangements 38, 40 may be open. When the outer bypass valve arrangement 38 is open, the fluid flows into the inner container volume 108, then flows through the screen 160 of the strainer 42, and then into the outflow path 44. When the inner bypass valve arrangement 40 is opened, the fluid flows from the second open filter interior 128, into the inner container volume 108, through the screen 160, and into the outflow path 44.

After a period of operation, the filter arrangement 30 will be in need of servicing. To service the filter arrangement 30, the filter housing 50 is removed from the filter head 92. The filter housing 50 contains the filter cartridge 64. If the filter arrangement 30 is a spin-on filter, then the entire housing 50 plus filter cartridge 64 is disposed of and replaced with a new filter housing 50 having a new filter cartridge 64. If, alternatively, the filter arrangement 30 is a bowl-cartridge filter, then the filter cartridge 64 is removed from the housing 50, and a new filter cartridge 64 is replaced within the same, old housing 50. The new filter arrangement 30 is then operably mounted onto the filter head 92.

B. FIGS. 20-32

Attention is next directed to the filter arrangement 230 depicted in FIGS. 20-23. The filter arrangement 230 is similar to the filter arrangement 30 of FIG. 3, but with some distinctions. For example, in the filter arrangement 230, there is no outer bypass valve analogous to outer bypass valve 38. This is because the media 266 used in the first filter element 232 has a greater porosity level and is less restrictive than the analogous media 66 for the analogous first filter element 32 of the embodiment of FIGS. 3 and 4. Preferably, the media 266 is an open porous screen, which means the likelihood of undue restriction across the media 266 not at a level to cause the need for a bypass valve. Because there is no outer bypass valve, the first endcap 268, analogous to the first endcap 68, is closed and is bypass valve-free; that is, there is no opening or valve seat.

Figure 20:
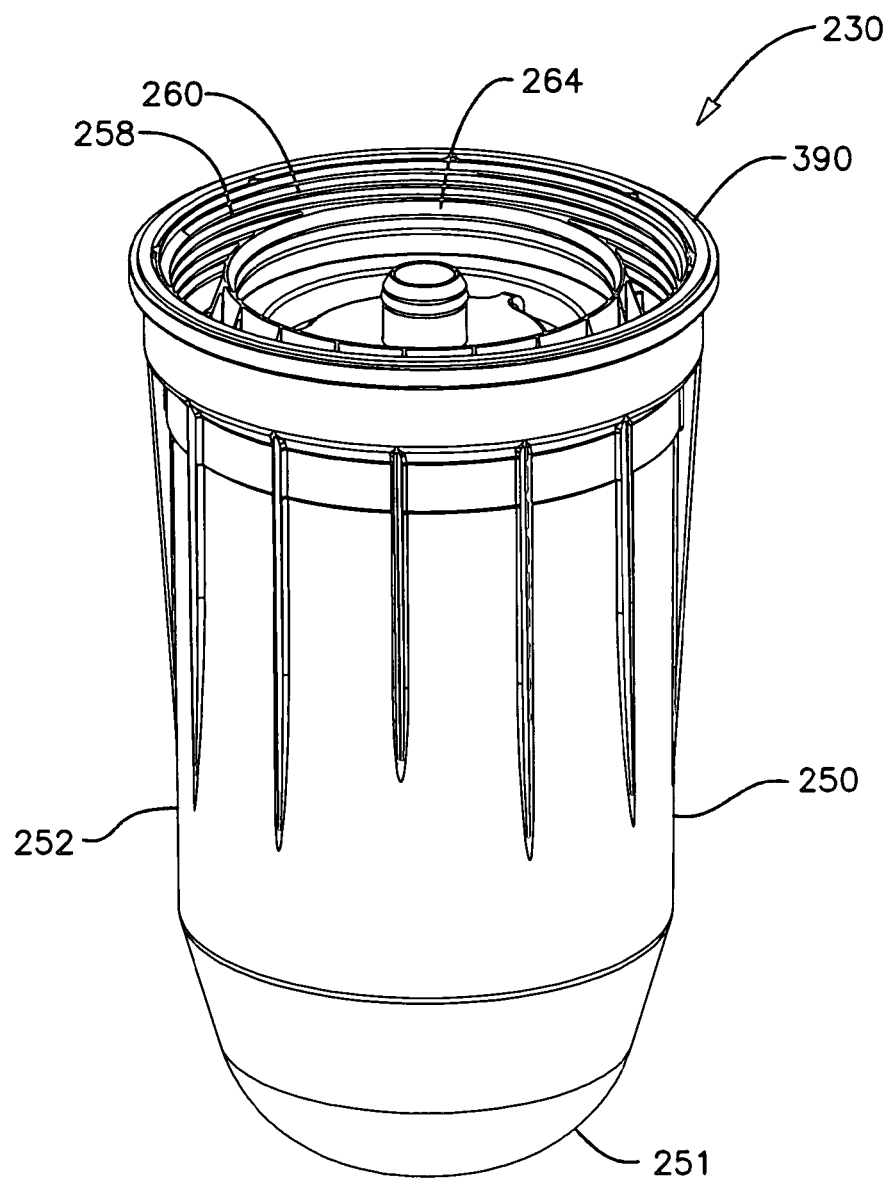
FIG. 20 is a perspective view of another embodiment of a filter assembly usable in the hydraulic circuits of FIGS. 1 and 2, constructed according to principles of this disclosure.
Figure 21:
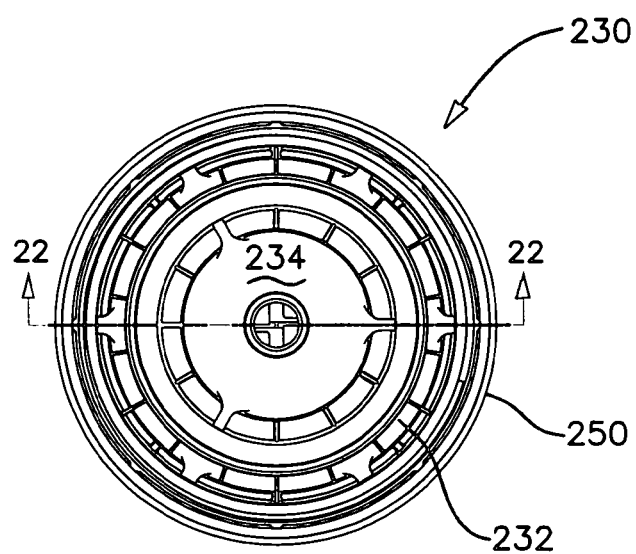
FIG. 21 is a top plan view of the filter assembly depicted in FIG. 20.
Figure 23:
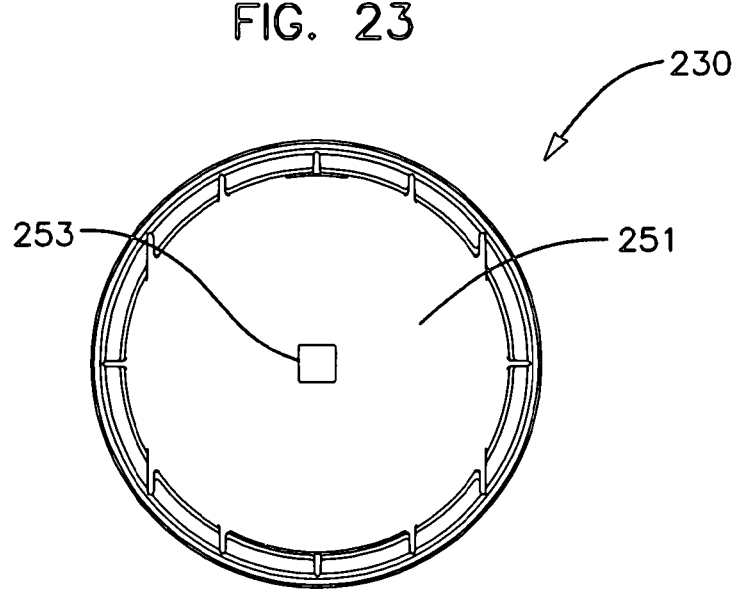
FIG. 23 is a bottom plan view of the filter assembly depicted in FIGS. 20 and 21.

Other differences between the filter arrangement 230 of FIG. 20 and the filter arrangement 30 of FIG. 3 includes the end shape of the housing 250 has a rounded dome across the bottom 251 rather than a hexagonal shape as shown for the housing 50 of FIG. 3. The rounded dome shape of the bottom 251 is to provide increased strength to the housing 250. In addition, at the bottom 251, there is a square-shaped socket 253 (FIG. 23) to allow the user to both tighten and loosen the filter arrangement 230 from the filter head 292.

Figure 27:
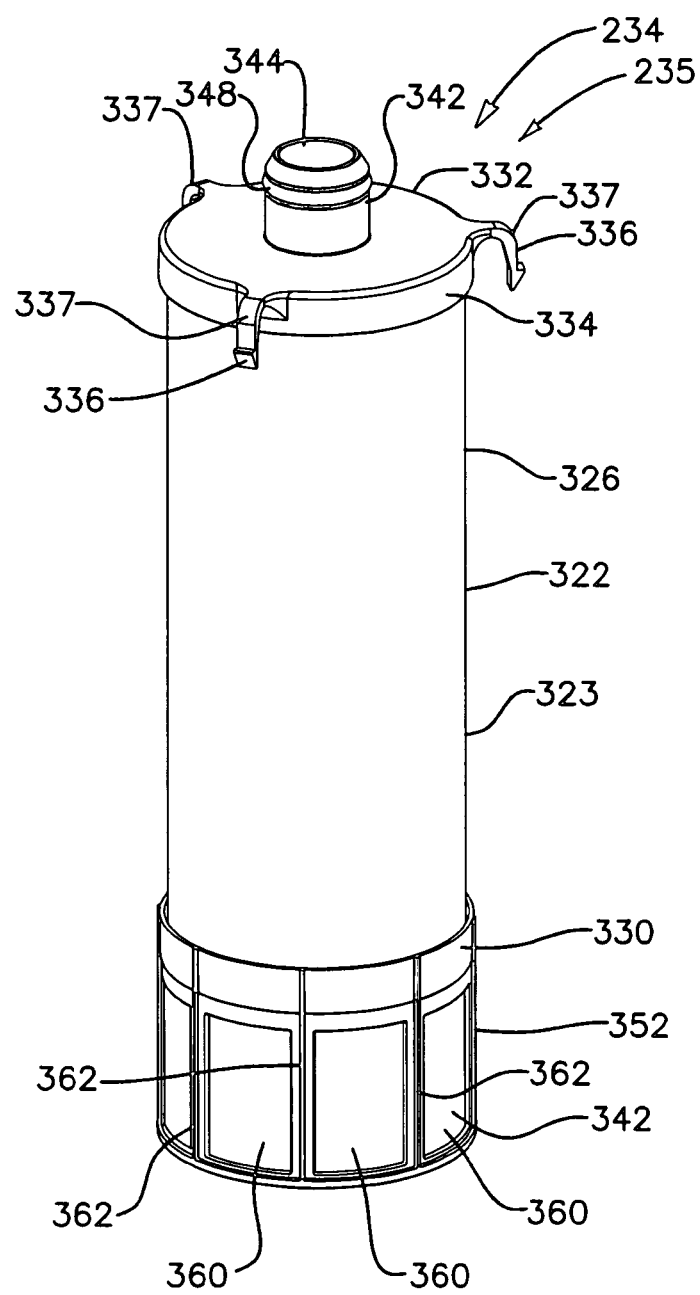
FIG. 27 is a perspective view of a second filter element usable in the filter assembly of FIGS. 20-23.

Another difference between the embodiment of the filter arrangement 230 and the filter arrangement 30 is the general geometry of the hooked flanges 336 extending from the second filter element 234. The hooked flanges 336 functionally do the same thing as hooked flanges 136, in that they engage by hooking onto an interior rim 338 (FIG. 22) of the second endcap 270 of the first filter element 232. In the embodiment of FIG. 27, the hooked flanges 336 have a greater arched leg 337 than the embodiment shown in FIG. 7 at 136.

A further difference between the embodiment of filter arrangement 30 and filter arrangement 230 is the difference between the outer rim 98 of the first endcap 68 and the outer rim 298 of the first endcap 268. The outer rim 298 has a lip 299 (FIG. 26) that deflects radially outwardly and engages or catches spaced ribs 301 (FIG. 22) on the housing 250. This engagement between the lip 299 and the spaced ribs 301 provides stability and prevents rattling of the filter arrangement 230 within the housing 250.

A summary of the features of the embodiment of the filter arrangement 230 are now described. As mentioned above, in general, the functions and features of the filter arrangement 230 are analogous to the functions and features of the filter arrangement 30, except for the differences mentioned above. The filter arrangement 230 includes housing 250 having surrounding wall 252 defining an interior volume 254. The housing 250 includes connection structure 256, depicted as threads 258 along the inner surface of the wall 252 at the open mouth 260. Opposite to the open mouth 260 is a closed end 262 which is also the bottom of the housing 251. While the housing 250 can be made from a variety of materials, in one embodiment, the housing 250 is made from non-metal, such as plastic.

Operably oriented within the housing 250 is a filter cartridge 264. In one embodiment, the filter cartridge 264 is removable and replaceable from the housing 250, such that the filter arrangement 230 is a bowl-cartridge filter. In the embodiment depicted in FIG. 22, the filter cartridge 264 is permanently mounted in the housing 250, such that the filter arrangement 230 is a spin-on filter. Definitions of a spin-on filter and a bowl-cartridge filter are provided above, in connection with the description of the filter arrangement 30.

Figure 24:
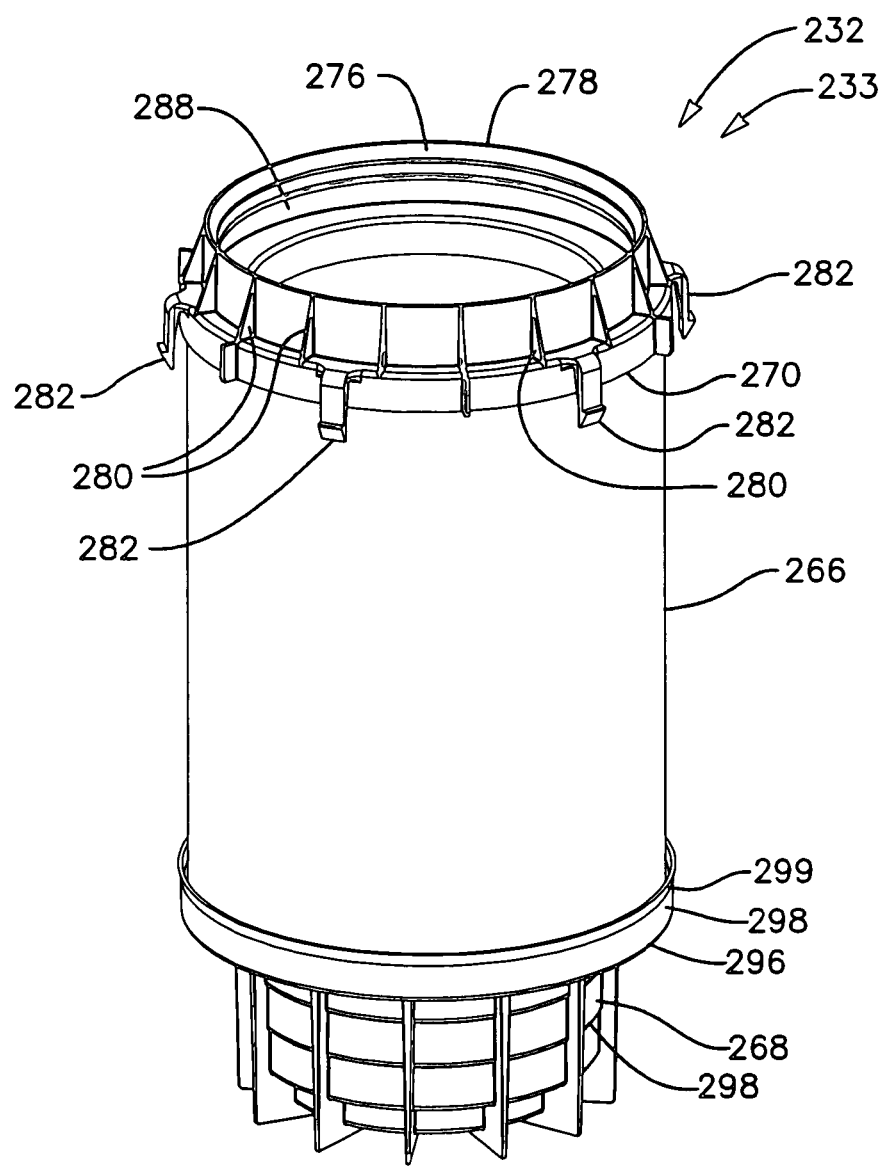
FIG. 24 is a perspective view of a first filter element usable in the filter assembly of FIGS. 20-23.
Figure 25:
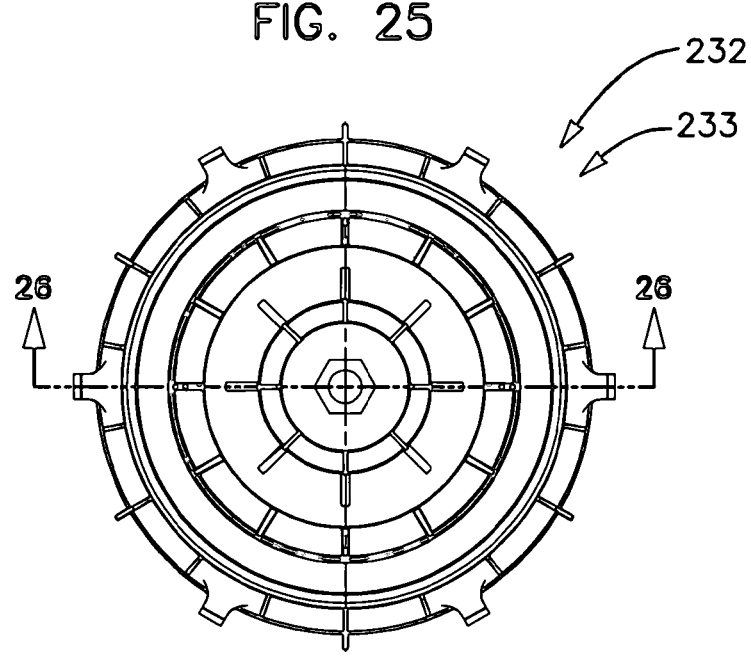
FIG. 25 is a top plan view of the first filter element shown in FIG. 24.
Figure 28:
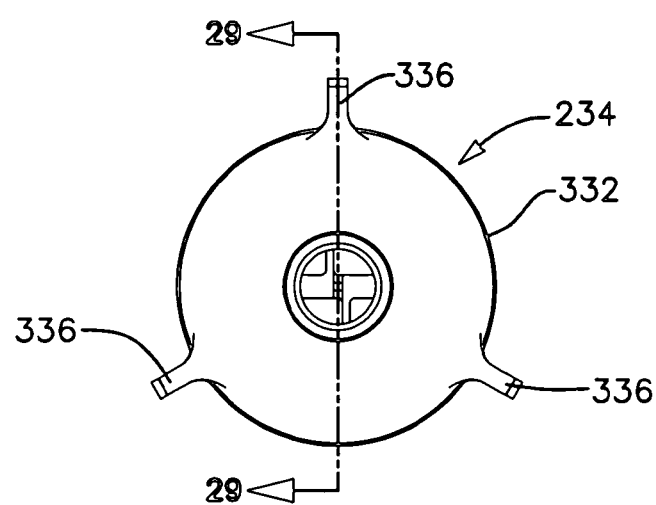
FIG. 28 is a top plan view of the second filter element of FIG. 27.
Figure 26:
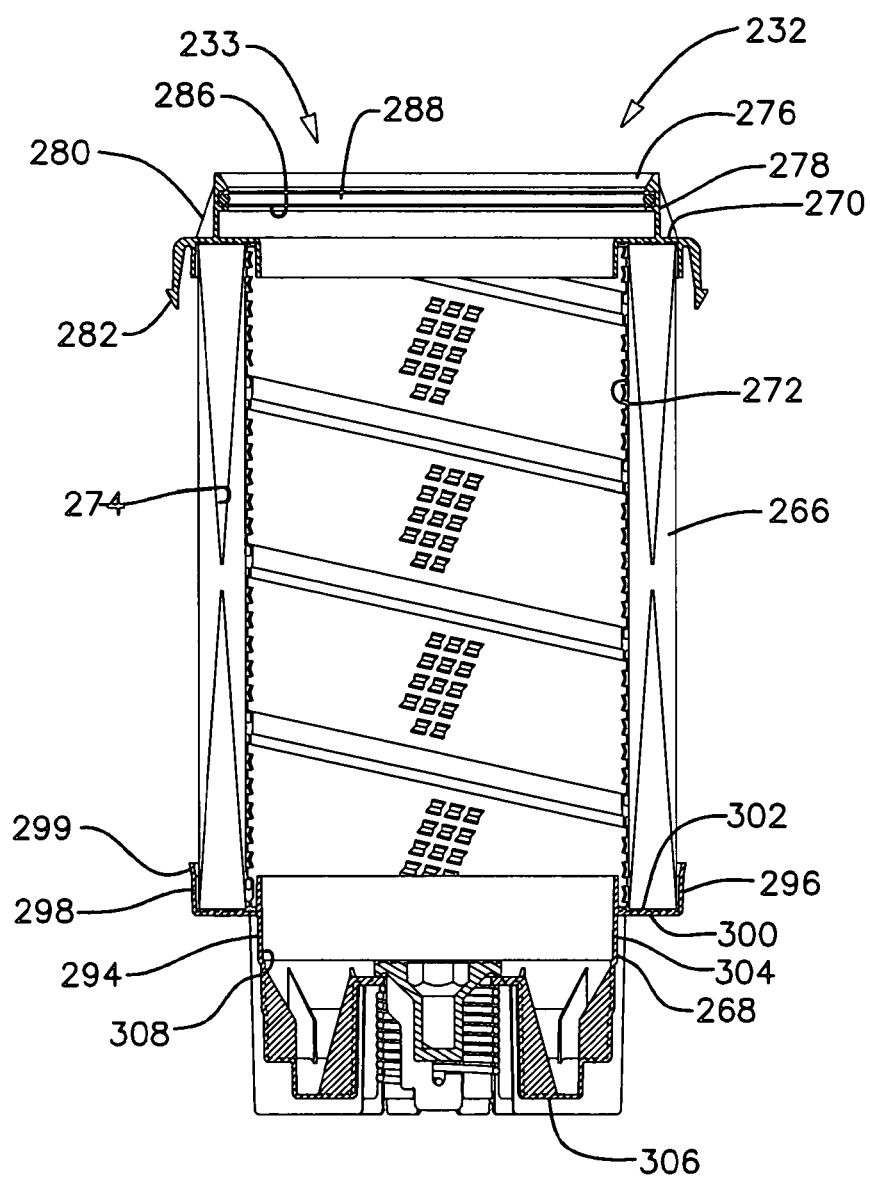
FIG. 26 is a cross-sectional view of the filter element shown in FIGS. 24 and 25, the cross-section being taken along the line 26-26 of FIG. 25.
Figure 29:
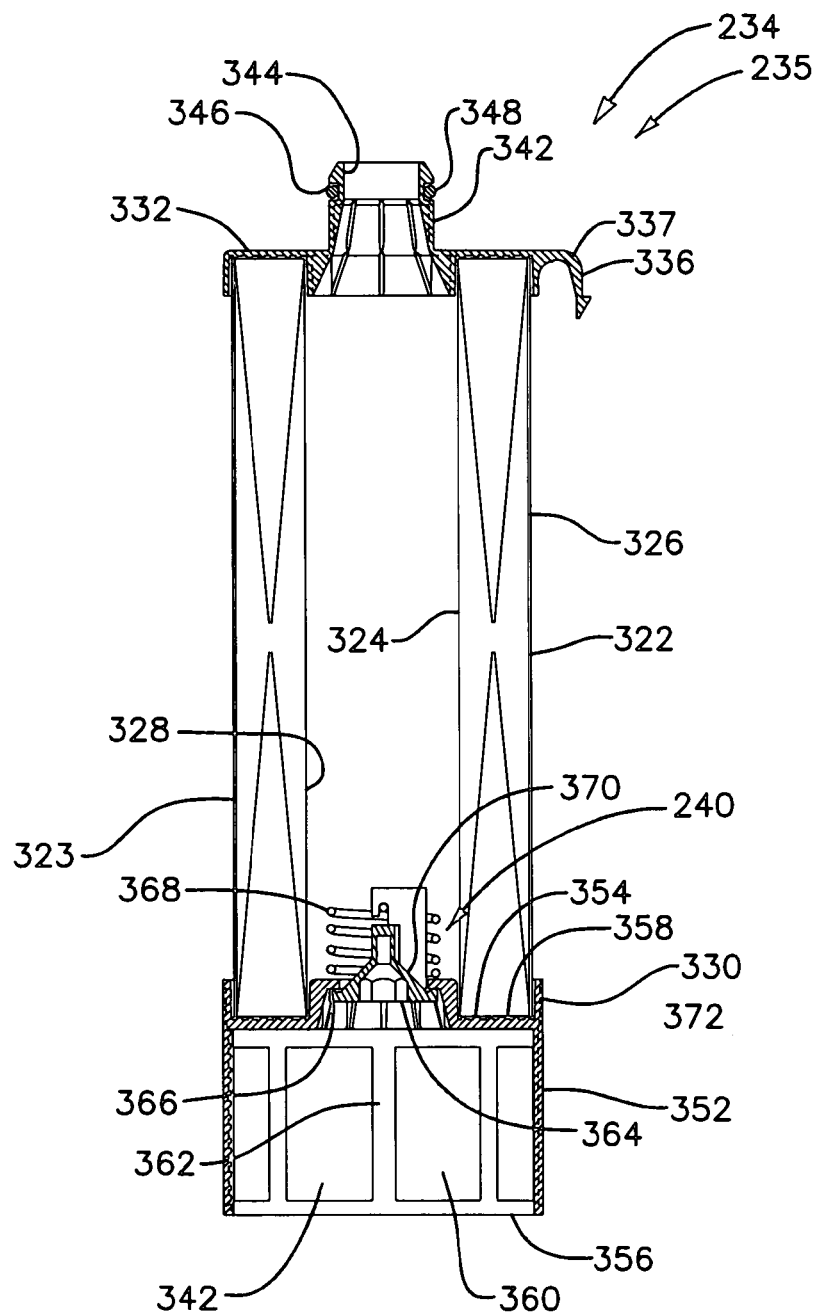
FIG. 29 is a cross-sectional view of the second filter element depicted in FIGS. 27 and 28, the cross-section being taken along the line 29-29 in FIG. 28.
Figure 30:
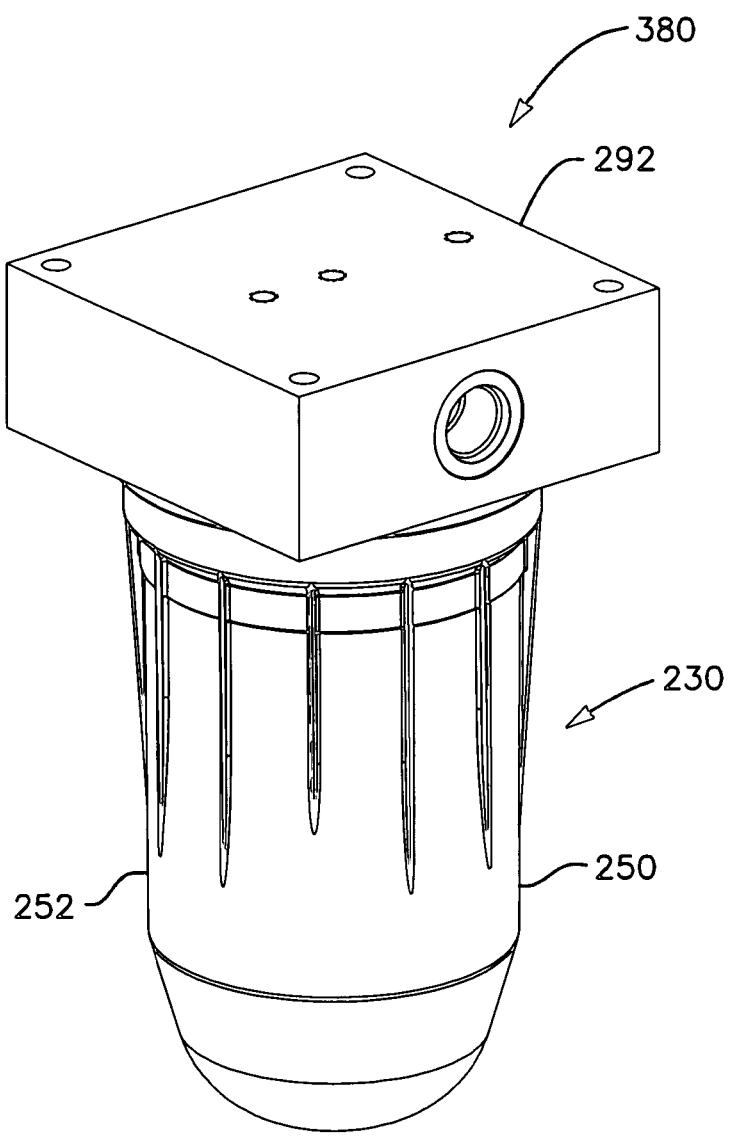
FIG. 30 is a perspective view of the filter assembly of FIGS. 20-23 connected to a filter head.

The filter cartridge 264 includes the first filter element 232 functioning as suction filter 233 and second filter element 234, functioning as return filter 235. FIGS. 24-26 depict the first filter element 232, while FIGS. 27-29 depict the second filter element 234.

The first filter element 232 includes a first tubular section of filter media 266. The media 266 can be a variety of types of media, and in this embodiment will be an open, porous screen. As mentioned above, this is one of the differences between the filter arrangement 230 and the filter arrangement 30. The first tubular section of filter media 266 extends between first endcap 268 and second endcap 270. The first tubular section of filter media 266 defines a first open filter interior 272. Lining the filter media 266 and extending between the first endcap 268 and second endcap 270 and defining the first open filter interior 272 is an inner liner 274.

The second endcap 270 defines an opening 276, and as such, is an open endcap 270. The opening 276 allows fluid access to the first open filter interior 272. The second endcap 270 includes an upstanding ring 278 and is supported by a series of spaced vanes 280. The second endcap also includes a plurality of hooked flanges 282 extending radially outwardly therefrom and in a direction opposite of the upstanding ring 278. In the spin-on embodiment, the flanges 282 catch a protrusion 284 extending from an interior surface of the housing surrounding wall 252.

As with the embodiment of the filter arrangement 30, the filter arrangement 230 can include variations, such as those shown in FIGS. 17 and 18. FIG. 18 would allow the filter arrangement 230 to be a bowl-cartridge filter embodiment.

The second endcap 270 further includes a groove 286 along an interior portion of the upstanding ring 278. The groove 286 is a seat for a seal member 288. The seal member 288 forms a releasable seal 290 with a filter head 292.

The first endcap 268 defines an inner container 294 and an outer container 296. The outer container 296 circumscribes or surrounds the inner container 294. The outer container 296 includes outer rim 298, and perpendicular to the outer rim 298, a base 300. The base 300 is secured to the first tubular section of filter media 266 at an end 302. The base 300 extends between the outer rim 298 and the wall 304 of the inner container 294. Generally parallel to the base 300 is an end wall 306. Together, the end wall 306 and the wall 304 define an inner container volume 308. The end wall 306 is axially spaced from the base 300 and outer container 296.

As described above, in this embodiment, the inner container 294 is solid, closed, and bypass valve-free. Because the media 266 is an open-porous screen, the risk of having a high restriction across the media 266 is less of a concern.

The second filter element 234 includes a second tubular section of filter media 322 having an upstream side 324 and an downstream 326. The second tubular section of filter media 322 defines a second open filter interior 328 which is adjacent and next to the upstream side 324. The filter media 322 can be various types of media, and in the embodiment shown, is pleated media. The media 322 can be made from various materials including synthetic or cellulose media. The second tubular section of filter media 322 extends between a third endcap 330 and a fourth endcap 332. In the embodiment illustrated, the second filter element 234 further includes an outer liner 323 extending between the third endcap 330 and fourth endcap 332. The outer liner 323 can be made from perforated metal.

The fourth endcap 332 includes outer rim 334. Projecting from the outer rim 334 are the plurality of hooked flanges 336, described above. In this embodiment, there are three evenly-spaced hooked flanges 336. The hooked flanges 336 engage by hooking onto an interior rim 338 of the second endcap 270 of the first filter element 232. The fourth endcap 332 further includes an end wall 340 generally perpendicular to the outer rim 334. The end wall 340 and outer rim 334 together define a holding tray 335 for securing an end of the media 322. The fourth endcap 332 further includes a centrally-extending tubular wall 342. The tubular wall 342 defines an opening 344, which is in open fluid communication with the second open filter interior 328. The tubular wall 342 defines a groove 346 along the outer radial surface for holding a seal member 348. The seal member 348 forms a seal 350 (FIG. 31) with the filter head 292, when the filter arrangement 230 is operably-connected to the filter head 292.

The third endcap 330 has an outer wall 352 and first and second opposite ends 354, 356. The first end 354 also corresponds to a media 358 end and is secured to the second tubular section of media 322. The outer wall 352 is a tubular wall and extends from the media end 354 terminating at the second end 356. The end 356 is remote from the filter media 322. When the second filter element 234 is operably part of the filter assembly 230, the tubular wall 352 of the third endcap 330 is oriented within the volume 308 (FIG. 26) of the inner container 294 and is circumscribed by the inner container 294.

In the hydraulic system of FIG. 1 which uses strainer 42, the strainer 342 is part of the third endcap 330. The third endcap 330 includes strainer 342 depicted, in this embodiment, as a plurality of mesh screens 360 supported and held by a frame 362. The frame 362 is depicted as a plurality of spaced support members extending longitudinally from the endcap 330. In typical embodiments, the endcap 330 including the frame 362 will be made from a non-metal material, such as plastic. The screens 360 will be an open mesh that prevents large debris from passing into the outflow channel 244 and otherwise does not impede flow. The mesh size for the screens can vary, based on the system, and in typical systems, can be about 250 micron or 50 mesh (50 wires/inch).

Figure 22:
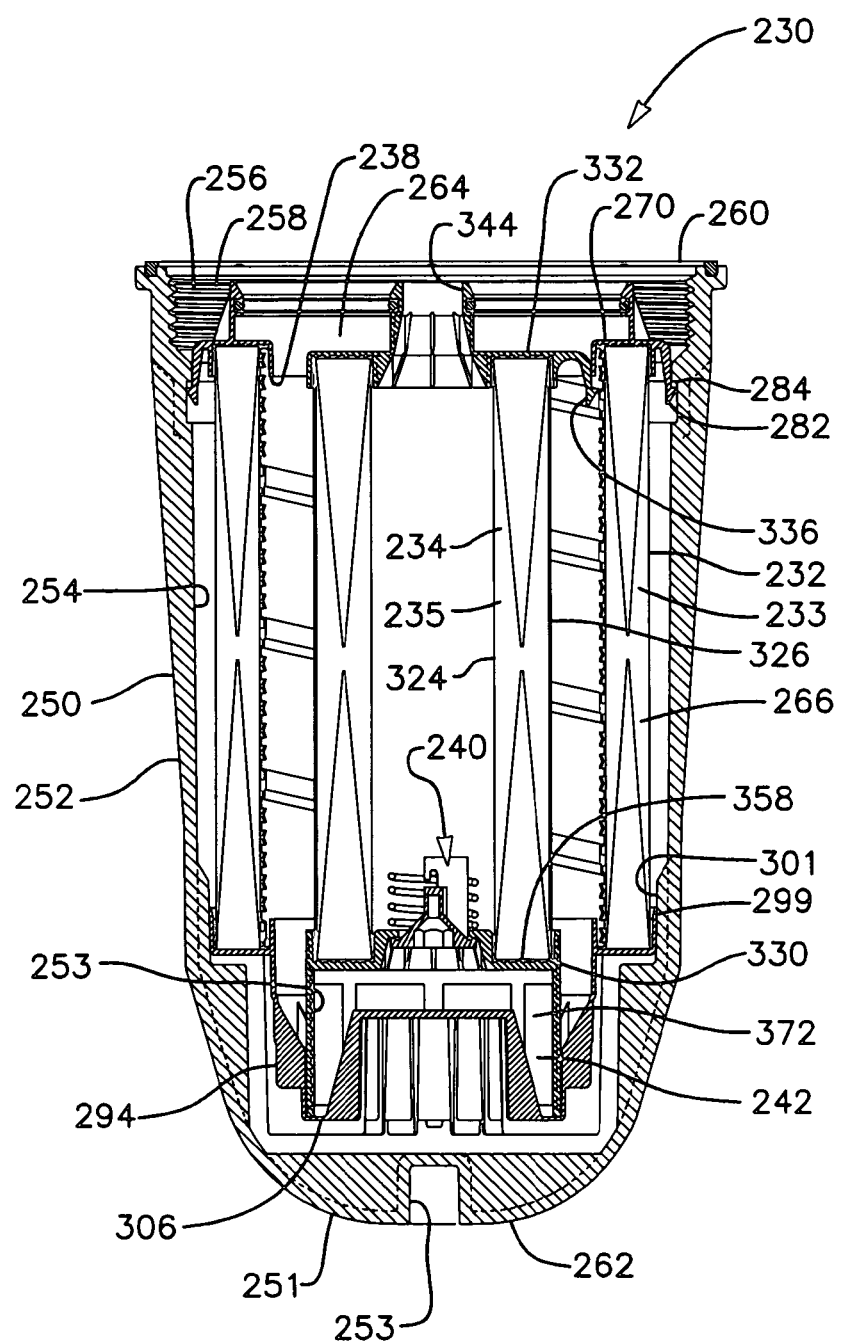
FIG. 22 is a cross-sectional view of the filter assembly depicted in FIGS. 20 and 21, the cross-section being taken along the line 22-22 of FIG. 21.

When the second filter element 234 and the first element 232 are operably-assembled together, the tubular wall 352 of the third endcap 330 is oriented against the end wall 306 of the inner container 294. As can be seen in FIG. 22, the tubular wall 352 includes the strainer 242 extending between the media end 358 of the third endcap 330 and the end wall 306 of the inner container 294.

The inner bypass valve arrangement 240 is secured to the third endcap 330 and is held within the open filter interior 328 of the second tubular section of media 322. The inner bypass valve arrangement 240 is constructed similarly to the inner bypass valve arrangement 40. The inner bypass valve arrangement 240 includes a valve head 364 biased against a valve seat 366 by a spring member 368. The valve seat 366 is defined by the third endcap 330. An upstream side of the valve head is shown at 370 and is in fluid communication with the upstream side 324 of the second tubular section of media 322. In the case of a cold start or when the filter media 322 is occluded, the pressure on the upstream side 370 of the valve head 364 will overcome the pressure caused by the force of the spring 368. This will open a gap between the valve head 364 and the valve seat 366, which will permit fluid to flow into the volume 372. The volume 372 is the inner volume defined by the tubular wall 352 of the third endcap 330. From there, the fluid flows through the screen 360 of the strainer 242 and then to the outflow path 244.

Figure 31:
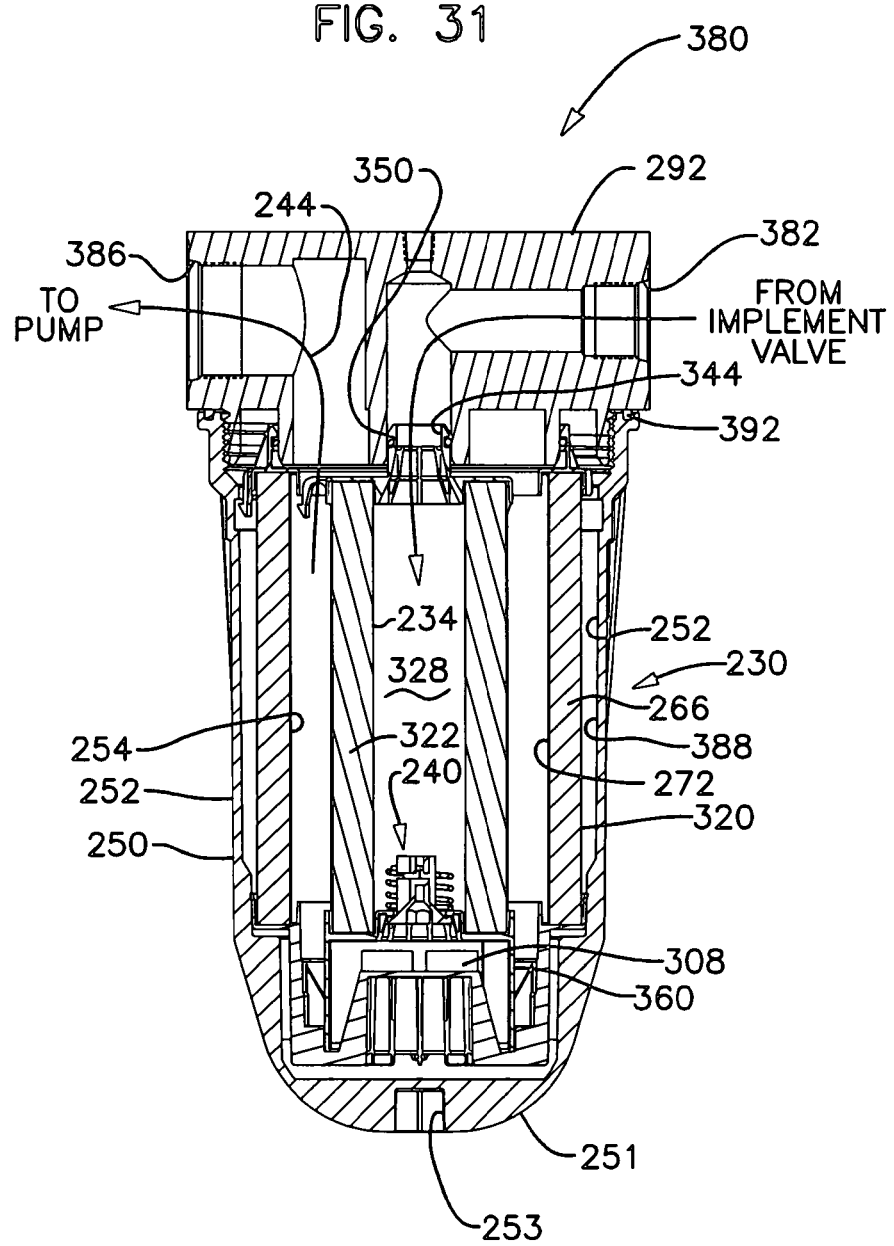
FIGS. 31 and 32 are cross-sectional views of the filter assembly and filter head of FIG. 30 and showing various flow paths through the assembly.

The overall filter assembly 380 includes filter head 292 operably-connected to the filter arrangement 230. The filter head 292 is in fluid communication with the hydraulic system 20. In FIG. 31, an implement valve inlet port 382 is viewable. The implement valve inlet port 382 is in fluid communication with the implement valve 26.

Figure 32:
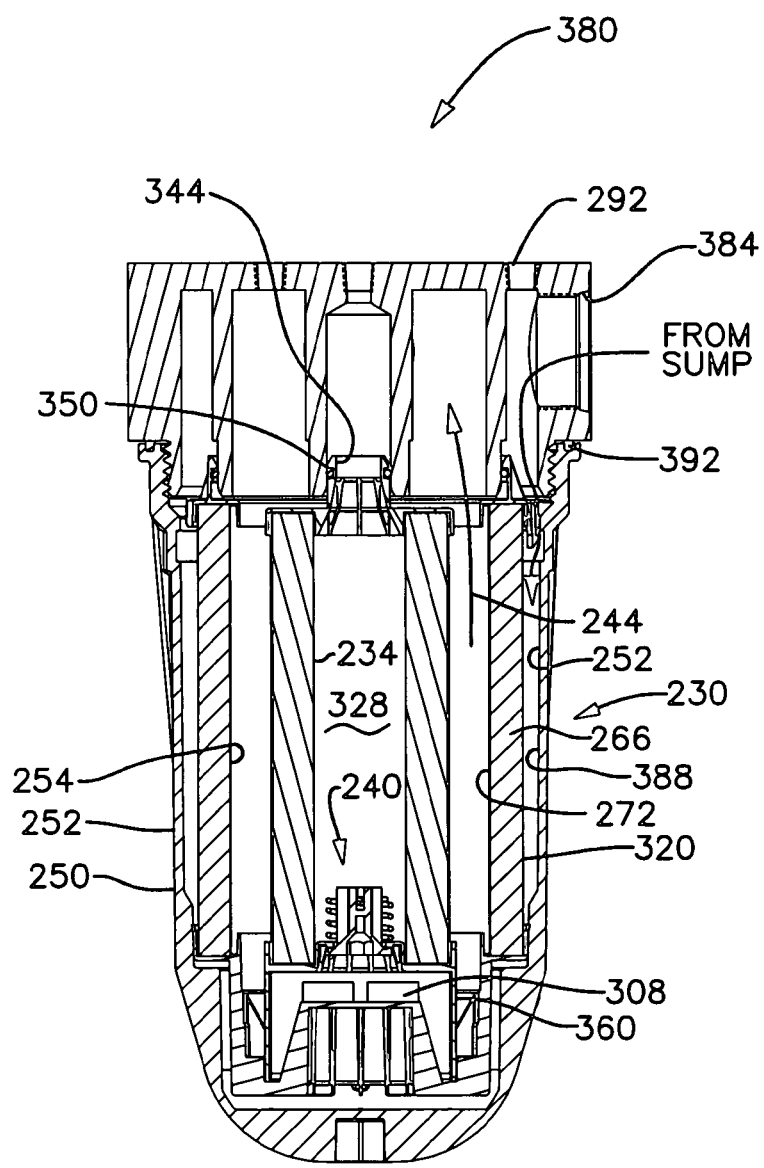

In FIG. 32, the sump inlet port 384 can be seen. The sump inlet port 384 is downstream of and in fluid communication with the sump 22. The pump outlet port 386, FIG. 31, is upstream of and in fluid communication with the pump 84.

FIGS. 31 and 32 depict cross-sectional views of the filter assembly 380 and show operative flow paths through the assembly 380. FIG. 32 shows fluid flowing from the sump 22 through the sump inlet port 384, into the volume 388 defined between the upstream side 320 of the first filter element 232 and an inner section of the housing wall 252. From there, the fluid will flow through the first tubular section of filter media 266, into the first open filter interior 272, into the outlet flow path 244, and back into the filter head 292 in a space between the first filter element 232 and the second filter element 234.

Also viewable, in FIGS. 31 and 32 is a seal 392 between the filter head 292 and the housing 250. The seal 392 is created by seal member 390 (FIG. 22) circumscribing the open mouth 260 of the housing 250.

FIG. 31 shows the outflow path 244 and the filtered fluid flowing back into the filter head 292 and through the pump outlet port 386. The filtered fluid then travels to the pump 24. In FIG. 31, the fluid is also shown entering the filter head 292 from the implement valve 26 through the implement valve inlet port 382. From there, the fluid flows through the opening 344 in the tubular wall 342 of the second filter element 234. From there, it enters into the second open filter interior 328. During normal conditions, the fluid then flows through the second tubular section of filter media 322 into the outlet flow path 244, where it meets up with fluid that has flown through the first tubular section of filter media 266 in which it then flows into the filter head 292 and out through the pump outlet port 386.

If the second filter element 234 becomes occluded, or in the condition of a cold-start, the inner bypass valve arrangement 240 may be opened. In such a state, the fluid flows from the second open filter interior 328, into the inner container volume 308, through the screen 360, and into the outflow path 244.

After a period of operation, the filter arrangement 230 will need of servicing. To service the filter arrangement 230, the filter housing 250 is removed from the filter head 292. The filter housing 250 contains the filter housing 254. If the filter arrangement 230 is a spin-on filter, then the entire housing 250 plus filter cartridge 264 is disposed of and replaced with a new filter housing 250 having a new filter cartridge 264. If, alternatively, the filter arrangement 230 is a bowl-cartridge filter, then the filter cartridge 264 is removed from the housing filter 250, and a new filter cartridge 264 is replaced with the same old housing. The new filter arrangement 330 is then operably-mounted onto the filter head 292.

We claim:

1. A filter arrangement comprising:
   (a) a filter cartridge including a first filter element and a second filter element;
      (i) the first filter element including a first tubular section of filter media extending between first and second end caps and defining a first open filter interior;
      (ii) the second filter element including a second tubular section of filter media operably oriented in the first open filter interior; the second section of filter media being radially spaced from the first section of filter media to form an outflow passage for the first and second filter elements; the second tubular section of filter media extending between third and fourth end caps and defining a second open filter interior; the fourth end cap including an opening communicating with an inlet for the filter arrangement; the second and fourth end caps being positioned adjacent an end of the filter arrangement communicating with an outlet for the outflow passage;
      (iii) the first end cap defining an inner container and an outer container circumscribing the inner container;
         (A) the outer container being secured to the first tubular section of filter media;
         (B) the inner container having an end wall axially spaced from the outer container;
      (iv) the third end cap positioned adjacent to the first end cap and having a media end secured to the second tubular section of filter media; and
      (v) an inner bypass valve secured to the third end cap;
         (A) the inner bypass valve selectively allowing passage of fluid to the outflow passage of the filter arrangement without flowing through the second tubular section of filter media.

2. A filter arrangement according to claim 1 further comprising:
   (a) a housing including a surrounding wall defining an interior volume; the housing including connection structure to permit selective attachment to a filter head;
      (i) the filter cartridge being operably oriented within the interior volume of the housing.

3. A filter arrangement according to claim 2 wherein:
   (a) the filter cartridge is removable and replaceable within the housing.

4. A filter arrangement according to claim 3 wherein:
(a) the second end cap includes a flange arrangement that catches a protrusion extending from an interior surface of the housing surrounding wall.

5. A filter arrangement according to claim 2 wherein:
(a) the filter cartridge is permanently secured within the housing.

6. A filter arrangement according to claim 2 further including a filter head operably connected to the housing and wherein:
(a) the filter head has a sump inlet arrangement; an implement valve inlet arrangement; and a pump outlet arrangement;
  (i) the sump inlet arrangement being upstream of and in fluid communication with an upstream side of the first filter element; the upstream side of the first filter element being an outer side of the first tubular section of filter media;
  (ii) the implement valve inlet arrangement being upstream of and in fluid communication with an upstream side of the second filter element; the upstream side of the second filter element being along the second open filter interior; and
  (iii) the pump outlet arrangement being downstream of and in fluid communication with a downstream side of the first filter element and a downstream side of the second filter element;
    (A) the downstream side of the first filter element being along the first open filter interior; and
    (B) the downstream side of the second filter element being an outer side of the second tubular section of filter media.

7. A filter arrangement according to claim 1 wherein:
(a) the first tubular section of filter media comprises a porous screen; and
(b) the inner container of the first end cap is closed and is bypass valve-free.

8. A filter arrangement according to claim 1 further comprising:
(a) an outer bypass valve secured to the inner container of the first end cap;
  (i) the outer bypass valve selectively allowing passage of fluid to an outflow passage of the filter arrangement without flowing through the first tubular section of filter media.

9. A method of servicing a filter arrangement comprising:
(a) removing a filter housing from a filter head; the filter housing containing a filter cartridge; and
(b) providing a new, replacement filter cartridge; the new, replacement filter cartridge including a first filter element and a second filter element;
  (i) the first filter element including a first tubular section of filter media extending between first and second end caps and defining a first open filter interior;
  (ii) the second filter element including a second tubular section of filter media operably oriented in the first open filter interior; the second section of filter media being radially spaced from the first section of filter media to form an outflow passage for the first and second filter elements; the second tubular section of filter media extending between third and fourth end caps and defining a second open filter interior; the fourth end cap including an opening communicating with an inlet for the filter arrangement; the second and fourth end caps being positioned adjacent an end of the filter arrangement communicating with an outlet for the outflow passage;
  (iii) the first end cap defining an inner container and an outer container circumscribing the inner container;
    (A) the outer container being secured to the first tubular section of filter media;
    (B) the inner container having an end wall axially spaced from the outer container;
  (iv) the third end cap positioned adjacent to the first end cap and having a media end secured to the second tubular section of filter media; and
  (v) an inner bypass valve secured to the third end cap;
    (A) the inner bypass valve selectively allowing passage of fluid to the outflow passage of the filter arrangement without flowing through the second tubular section of filter media.

10. A method according to claim 9 wherein:
(a) the step of providing a new replacement filter cartridge includes providing a new replacement filter cartridge permanently connected to a new filter housing.

11. A method according to claim 9 wherein:
(a) the step of providing a new replacement filter cartridge includes providing a new replacement filter cartridge removably replaceable in the filter housing.

* * * * *